United States Patent
Östrup et al.

(10) Patent No.: US 11,356,986 B2
(45) Date of Patent: Jun. 7, 2022

(54) METHODS, APPARATUSES AND COMPUTER PROGRAMS FOR PROVIDING AN X2 INTERFACE BETWEEN A NETWORK UNIT AND A REMOTE NETWORK IN WIRELESS COMMUNICATION SYSTEMS

(71) Applicant: Telefonaktiebolaget LM Ericsson (publ), Stockholm (SE)

(72) Inventors: Peter Östrup, Linköping (SE); Patrik Jonasson, Nykil (SE); Anders Johansson, Linköping (SE); Tomas Johansson, Linköping (SE); Simon Björklén, Norrköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 236 days.

(21) Appl. No.: 15/768,441

(22) PCT Filed: Oct. 15, 2015

(86) PCT No.: PCT/SE2015/051093
§ 371 (c)(1),
(2) Date: Apr. 13, 2018

(87) PCT Pub. No.: WO2017/065657
PCT Pub. Date: Apr. 20, 2017

(65) Prior Publication Data
US 2018/0352546 A1    Dec. 6, 2018

(51) Int. Cl.
*H04W 72/04* (2009.01)
*H04L 29/06* (2006.01)
(Continued)

(52) U.S. Cl.
CPC ......... *H04W 72/0413* (2013.01); *H04L 69/18* (2013.01); *H04W 88/085* (2013.01);
(Continued)

(58) Field of Classification Search
CPC .... H04L 69/18; H04W 88/085; H04W 88/10; H04W 36/0027; H04W 36/0069;
(Continued)

(56) References Cited

U.S. PATENT DOCUMENTS

2010/0272007 A1* 10/2010 Shen ................... H04B 7/2606
                                                              370/315
2012/0300710 A1    11/2012 Li et al.
(Continued)

OTHER PUBLICATIONS

Author Unknown, "Technical Specification Group Radio Access Network; Evolved Universal Terrestrial Radio Access Network (E-UTRAN); X2 application protocol (X2AP) (Release 12)," Technical Specification 36.423, Version 12.7.0, 3GPP Organizational Partners, Sep. 2015, 209 pages.
(Continued)

*Primary Examiner* — Phong La
(74) *Attorney, Agent, or Firm* — Sage Patent Group

(57) ABSTRACT

The proposed technology concerns network units and, which are typically remotely located, and from the perspective of one of the network units, the other network unit is therefore referred to as a remote network unit. The network unit is configured to provide Radio Resource Control, RRC, and/or Packet Data Convergence Protocol, PDCP, protocol functionality, and comprises an X2 unit for providing an X2 interface between the RRC and/or PDCP protocol functionality of the network unit and lower protocol layer(s) and/or sub-layer(s) of the remote network unit. The network unit is configured to provide Radio Link Control, RLC, and/or Medium Access Control, MAC, protocol functionality, and comprises an X2 unit for providing an X2 interface between the RLC and/or MAC protocol functionality of the network unit and higher protocol layer(s) and/or sub-layer(s) of the remote network unit.

33 Claims, 18 Drawing Sheets

(51) Int. Cl.
*H04W 88/08* (2009.01)
*H04L 69/18* (2022.01)
*H04W 92/04* (2009.01)
*H04W 92/12* (2009.01)
*H04W 76/10* (2018.01)

(52) U.S. Cl.
CPC .......... *H04W 76/10* (2018.02); *H04W 92/045* (2013.01); *H04W 92/12* (2013.01)

(58) Field of Classification Search
CPC ..... H04W 36/04; H04W 76/27; H04W 76/10; H04W 92/10; H04W 92/045; H04W 92/12
USPC ........................................................ 370/329
See application file for complete search history.

(56) References Cited

U.S. PATENT DOCUMENTS

| | | | | |
|---|---|---|---|---|
| 2014/0056243 A1* | 2/2014 | Pelletier | ............ | H04W 72/1268 370/329 |
| 2014/0226481 A1* | 8/2014 | Dahod | ................. | H04W 72/04 370/235 |
| 2015/0133137 A1* | 5/2015 | Lee | .................. | H04W 72/0486 455/452.1 |
| 2015/0312904 A1* | 10/2015 | Ma | ..................... | H04L 12/6418 370/329 |
| 2015/0350883 A1* | 12/2015 | Yamada | .............. | H04W 72/044 370/338 |
| 2016/0100425 A1* | 4/2016 | Dinan | ................... | H04W 52/18 370/329 |
| 2016/0119831 A1* | 4/2016 | Deng | ................ | H04W 36/0072 455/436 |
| 2016/0164793 A1* | 6/2016 | Basu Mallick | ....... | H04L 47/564 370/235 |
| 2016/0234714 A1* | 8/2016 | Basu Mallick | ... | H04W 28/0278 |
| 2016/0242128 A1* | 8/2016 | Loehr | ................ | H04W 52/346 |
| 2017/0195901 A1* | 7/2017 | Zhou | ..................... | H04W 16/14 |
| 2018/0049098 A1* | 2/2018 | Ueda | ..................... | H04W 40/22 |
| 2018/0213450 A1* | 7/2018 | Futaki | .................. | H04W 16/32 |
| 2018/0213579 A1* | 7/2018 | Hong | .................... | H04W 76/12 |
| 2019/0110305 A1* | 4/2019 | Ookubo | ................ | H04W 28/24 |

OTHER PUBLICATIONS

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Technical Specification 36.300, Version 12.7.0, 3GPP Organizational Partners, Sep. 2015, 254 pages.

International Search Report and Written Opinion for International Patent Application No. PCT/SE2015/051093, dated Jun. 15, 2016, 9 pages.

European Office Action issued in corresponding EP Application No. 15791049.8 dated Apr. 23, 2020, 04 Pages.

\* cited by examiner

METHODS, APPARATUSES AND COMPUTER PROGRAMS FOR PROVIDING AN X2 INTERFACE BETWEEN A NETWORK UNIT AND A REMOTE NETWORK IN WIRELESS COMMUNICATION SYSTEMS

This application is a 35 U.S.C. § 371 national phase filing of International Application No. PCT/SE2015/051093, filed Oct. 15, 2015, the disclosure of which is incorporated herein by reference in its entirety.

TECHNICAL FIELD

The proposed technology generally relates to network units for wireless communication systems and methods of operating a network unit, and corresponding radio units, base stations, core network units, cloud-based network devices including such a network unit, and corresponding computer programs and computer-program products, as well as apparatuses for supporting operation of a network unit.

BACKGROUND

Improved flexibility and the possibility to reuse functionality of different wireless communication systems becomes increasingly important as network operators want improved performance in a cost-efficient manner.

New evolved wireless communication systems are constantly being developed, and at the moment fifth generation, 5G, systems are being discussed in 3GPP standardization groups. 5G, also referred to as NX, is currently viewed primarily as a change to the radio specifications and more specifically to the lower protocol layers such as the Physical Layer and Layer 2 of the protocol stack. There are still no decisions on how a wireless communication device such as a UE connects to the radio access network, nor how a 5G base station connects to the core network.

There are some assumptions that higher protocol layers such as RRC and S1-AP as specified in Long Term Evolution, LTE, should be utilized, but it is hard to see from the 5G architecture overviews how this should be done and how to provide suitable connection interfaces.

There is also a general demand in modern wireless communication systems, including 3G, 4G as well as other systems, for distributed solutions with the flexibility to move functionality from the radio access network to the core network and/or a cloud-based environment. It is important to provide operators with improved possibilities to reduce costs for system deployments.

SUMMARY

There is thus a demand to provide versatile, flexible and cost-efficient solutions for wireless communication systems.

It is an object to provide a network unit for a wireless communication system.

It is also an object to provide a base station, a core network unit and/or a cloud-based network device comprising such a network unit.

Another object is to provide a complementary network unit for a wireless communication system.

Yet another object is to provide a radio unit comprising such a network unit.

Still another object is to provide corresponding methods of operating a network unit.

It is also an object to provide corresponding computer programs and computer-program products.

Another object is to provide apparatuses for supporting operation of a network unit.

These and other objects are met by embodiments of the proposed technology.

According to a first aspect, there is provided a network unit for a wireless communication system, wherein the network unit is configured to provide Radio Resource Control, RRC, and/or Packet Data Convergence Protocol, PDCP, protocol functionality, and the network unit comprises an X2 unit configured to provide an X2 interface between said RRC and/or PDCP protocol functionality of said network unit and lower protocol layer(s) and/or sub-layer(s) of another remote network unit.

According to a second aspect, there is provided a base station comprising such a network unit.

According to a third aspect, there is provided a core network unit comprising such a network unit.

According to a fourth aspect, there is provided a cloud-based network device comprising such a network unit.

According to a fifth aspect, there is provided a network unit for a wireless communication system, wherein the network unit is configured to provide Radio Link Control, RLC, and/or Medium Access Control, MAC, protocol functionality, and the network unit comprises an X2 unit configured to provide an X2 interface between said RLC and/or MAC protocol functionality of said network unit and higher protocol layer(s) and/or sub-layer(s) of another remote network.

According to a sixth aspect, there is provided a radio unit comprising a network unit according to the fifth aspect.

According to a seventh aspect, there is provided a method of operating a network unit, the method comprising:
  executing Radio Resource Control, RRC, and/or Packet Data Convergence Protocol, PDCP, protocol functionality; and
  providing an X2 interface between said RRC and/or PDCP protocol functionality of the network unit and lower protocol layer(s) and/or sub-layer(s) of another remote network unit.

According to an eighth aspect, there is provided a method of operating a network unit, the method comprising:
  executing Radio Link Control, RLC, and/or Medium Access Control, MAC, protocol functionality; and
  providing an X2 interface between said RLC and/or MAC protocol functionality of the network unit and higher protocol layer(s) and/or sub-layer(s) of another remote network unit.

According to a ninth aspect, there is provided a computer program comprising instructions, which when executed by at least one processor, cause the at least one processor to:
  execute Radio Resource Control, RRC, and/or Packet Data Convergence Protocol, PDCP, protocol functionality for a network unit; and
  enable an X2 interface between said RRC and/or PDCP protocol functionality of the network unit and lower protocol layer(s) and/or sub-layer(s) of another remote network unit.

According to a tenth aspect, there is provided a computer program comprising instructions, which when executed by at least one processor, cause the at least one processor to:
  execute Radio Link Control, RLC, and/or Medium Access Control, MAC, protocol functionality for a network unit; and
  enable an X2 interface between the RLC and/or MAC protocol functionality of the network unit and higher protocol layer(s) and/or sub-layer(s) of another remote network unit.

According to an eleventh aspect, there is provided a computer-program product comprising a computer-readable medium having stored thereon a computer program according to the ninth or tenth aspect.

According to a twelfth aspect, there is provided an apparatus for supporting operation of a network unit, wherein the apparatus comprises:

an execution module for executing Radio Resource Control, RRC, and/or Packet Data Convergence Protocol, PDCP, protocol functionality for a network unit; and an interface supporting module for enabling an X2 interface between the RRC and/or PDCP protocol functionality of the network unit and lower protocol layer(s) and/or sub-layer(s) of another remote network unit.

According to a thirteenth aspect, there is provided an apparatus for supporting operation of a network unit, wherein the apparatus comprises:

an execution module for executing Radio Link Control, RLC, and/or Medium Access Control, MAC, protocol functionality for a network unit;

an interface supporting module for enabling an X2 interface between the RLC and/or MAC protocol functionality of the network unit and higher protocol layer(s) and/or sub-layer(s) of another remote network unit.

In this way, versatile network unit(s) and corresponding methods are provided for allowing efficient and flexible communication between different protocol layers of a protocol stack for wireless communication.

By way of example, the network unit(s) may be used to support efficient connection establishment, for radio access with a radio unit, for a wireless communication device camping in the coverage area thereof, or to provide an efficient interface between remote units of a distributed base station.

In the former case, the proposed technology may allow wireless communication devices to camp on and connect through remote radio units not having higher protocol layer or sub-layer functions. For example, this may provide a satisfactory solution for integrating 5G radio units with existing wireless communication systems.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Figure 1:
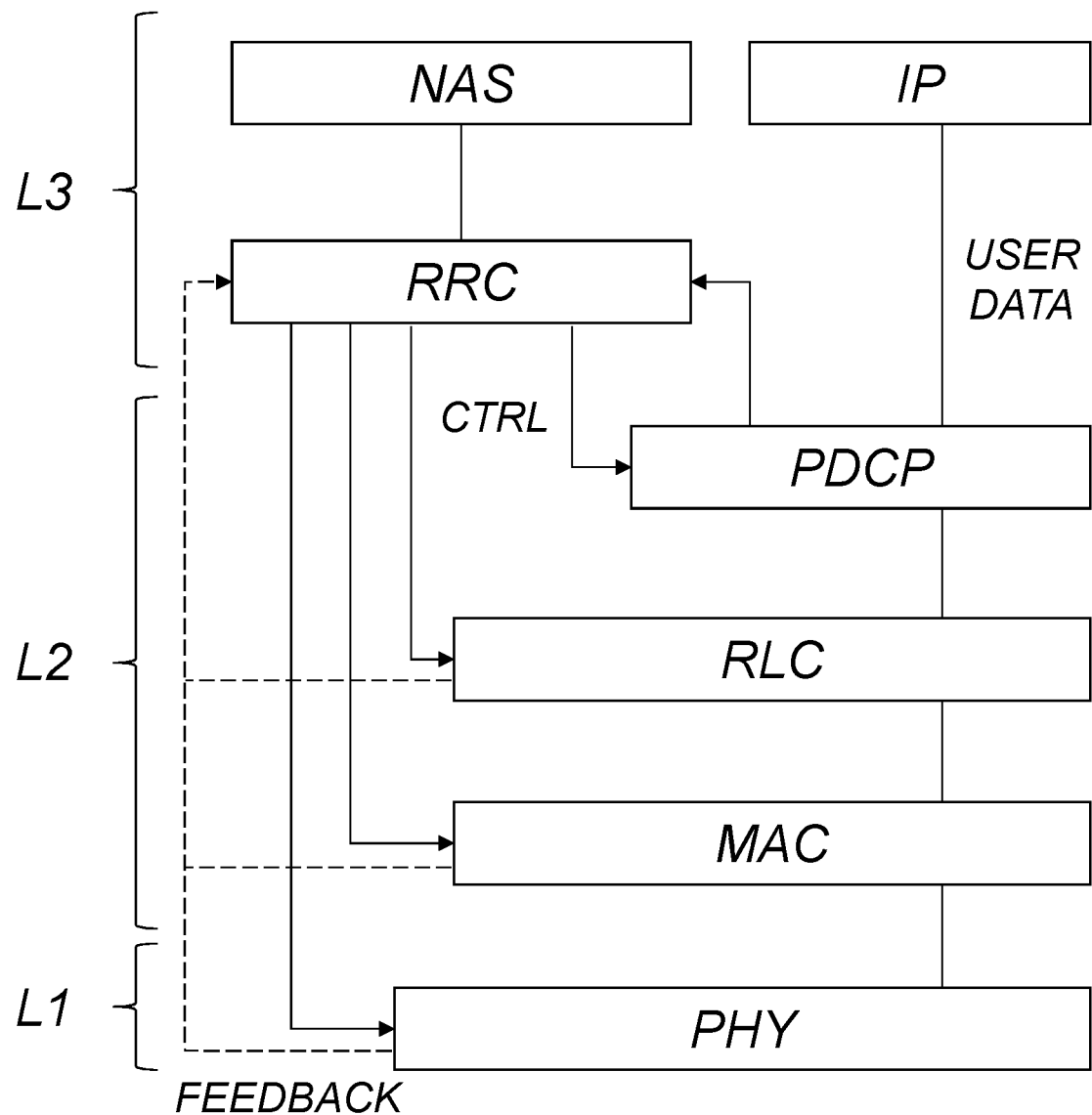
FIG. 1 is a schematic diagram illustrating an example of a protocol stack for a wireless communication system.

For a better understanding of the proposed technology, it may be useful to begin with a brief overview of a protocol stack for a wireless communication system, with reference to FIG. 1.

FIG. 1 is a schematic example illustrating three protocol layers, including sub-layers, of a protocol stack suitable for a wireless communication system such as LTE and the like.

The protocol stack is typically implemented for some form of underlying network unit or device including radio circuitry coupled to one or more antennas and/or circuits for communication with other similar network nodes, with end user equipment and with other network devices.

The lowest layer, L1, is the Physical Layer, PHY, followed by layer 2, L2, which includes the Medium Access Control, MAC, layer, the Radio Link Control, RLC layer, and the Packet Data Convergence Control, PDCP, layer. Layer 3, L3, includes the Radio Resource Control, RRC, layer and the Non Access Stratum, NAS, layer for control signalling, and the Internet Protocol, IP for user data.

L1 handles uplink and downlink in the Physical Layer, Layer 1 of the protocol stack. In uplink, L1 may for example process antenna data received from the radio circuitry, which processing may include removing cyclic prefix, running Fast Fourier Transform, FFT, to extract sub-channels, decoding/demodulating symbols, extracting physical channels and passing user information up to the MAC layer of L2. In downlink, L1 may for example take user data provided by the MAC lower of L2. Examples of tasks that may be performed by L1 in downlink may include constructing physical channels, performing turbo coding, scrambling, modulating, layer mapping, pre-coding, frequency mapping, inverse FFT, and cyclic prefix insertion and sending antenna data to the radio circuitry. To handle this processing, specialized hardware may be used, including accelerators, to form processing chains.

L2 typically includes a synchronous part and an asynchronous part. The synchronous part of L2 normally includes the MAC and RLC sub-layers. The asynchronous part of L2 normally includes the PDCP sub-layer.

The MAC sub-layer may have a separate entity for each connected UE, and a few additional entities for common needs such as system information, paging, and random access response. The RLC sub-layer may have a separate entity for each logical channel, corresponding to radio bearers. Downlink and uplink may operate independently of each other, with some signaling forwarded from the uplink to the downlink. Downlink: A task of synchronous L2 in downlink may be to take PDCP Packet Data Units, PDUs, from a PDCP PDU buffer and build MAC PDUs that are sent to L1. This may be triggered by a transmit order from User Plane Control, UPC, and is normally part of a latency-critical processing path. For example, less than 0.5 ms may be allowed for the synchronous L2 processing in downlink. In split scenarios this includes transport latency as well as processing latency. In downlink the synchronous part of L2 may also handle multiplexing of logical channels, HARQ retransmissions, MAC control elements, MAC procedures such as random access, RLC PDU buffering and retransmissions, and RLC status messages. The PDCP PDU buffers may typically be shared between the asynchronous part of L2 and the synchronous part of L2. If this is not possible, for example, if the asynchronous part of L2 is placed at a different site, a flow control mechanism may be added to transfer PDCP PDUs from the asynchronous part of L2 to the synchronous part of L2. Uplink: A task of the synchronous part of L2 in uplink may be to deconstruct MAC PDUs received from L1 into PDCP PDUs that are delivered to the asynchronous part of L2. In uplink, the synchronous part of L2 may also handle MAC control elements, MAC procedures such as random access, demultiplexing of logical channels, RLC PDU buffering, reordering and retransmissions, and RLC status messages. In uplink the synchronous part of L2 may typically not be part of a latency critical processing path, but may have a direct impact on the end-to-end packet latency.

User Plane Control (not shown explicitly in FIG. 1) comprises fast Radio Resource Management, RRM, functions that may occur on a per-sub-frame basis. This may e.g. include air-interface resource scheduling, link adaptation (transport format selection), and power control. UPC may use input from L1 and/or the synchronous part of L2, and generate messages to L1 and/or the synchronous part of L2. The input may include buffer status reports, measurement reports, Channel Quality Indicator, CQI, reports, and HARQ feedback. The messages may be control information sent to the UEs, as well as uplink and downlink scheduling commands sent to L1 and the synchronous part of L2. UPC may thus handle scheduling and optimization problems, involving many UEs and shared resources such as spectrum, power, and hardware.

As indicated, the asynchronous part of L2 normally includes the PDCP layer, whose primary tasks may be ciphering, header compression, and integrity protection for signaling. It may also support lossless handover. In downlink, the asynchronous part of L2 may maintain a PDCP PDU buffer, which is often shared with the synchronous part of L2. In cases where this is not possible, such as if L2 is split between different sites, a flow-control mechanism may be needed to transfer PDUs between the asynchronous part of L2 and the synchronous part of L2.

The L3 sub-layer RRC normally includes the control of one or more of the following functions: connection handling, such as setup and release of connections, mobility handling, such as handover or redirection release, UE Measurement Control, Load Management, such as Inter-Frequency Load Balancing and Offload, and Enhanced Multimedia Broadcast and Multicast Services, eMBMS. By way of example, services and functions of the RRC sub-layer of L3 may also include broadcast of System Information, key management, establishment, configuration, maintenance and release of point-to-point Radio Bearers.

NAS, which may also be regarded as part of L3, typically form the highest stratum of the control plane between the UE and the Mobility Management Entity, MME. NAS supports the mobility of the UE and the session management procedures to establish and maintain IP connectivity between the UE and a corresponding gateway.

For various reasons, as will be exemplified later on, the proposed technology suggests splitting the protocol stack for location at different, usually remotely located, sites, using an X2 interface between the protocol layers and/or sublayers of the protocol stack.

The X2 protocol is part of the LTE standard, but for connecting different LTE base stations base stations, eNbs, to each other for the purpose of handing over a UE from one eNb to another eNb with minimal signaling towards the core network. Normally, the X2 protocol includes the X2 Application Protocol, X2AP, and/or the X2 User, X2U, protocol.

The X2 protocol has not previously been used in the context of splitting the protocol stack and providing an interface between the protocol layers and/or sublayers of the protocol stack.

Figure 2:
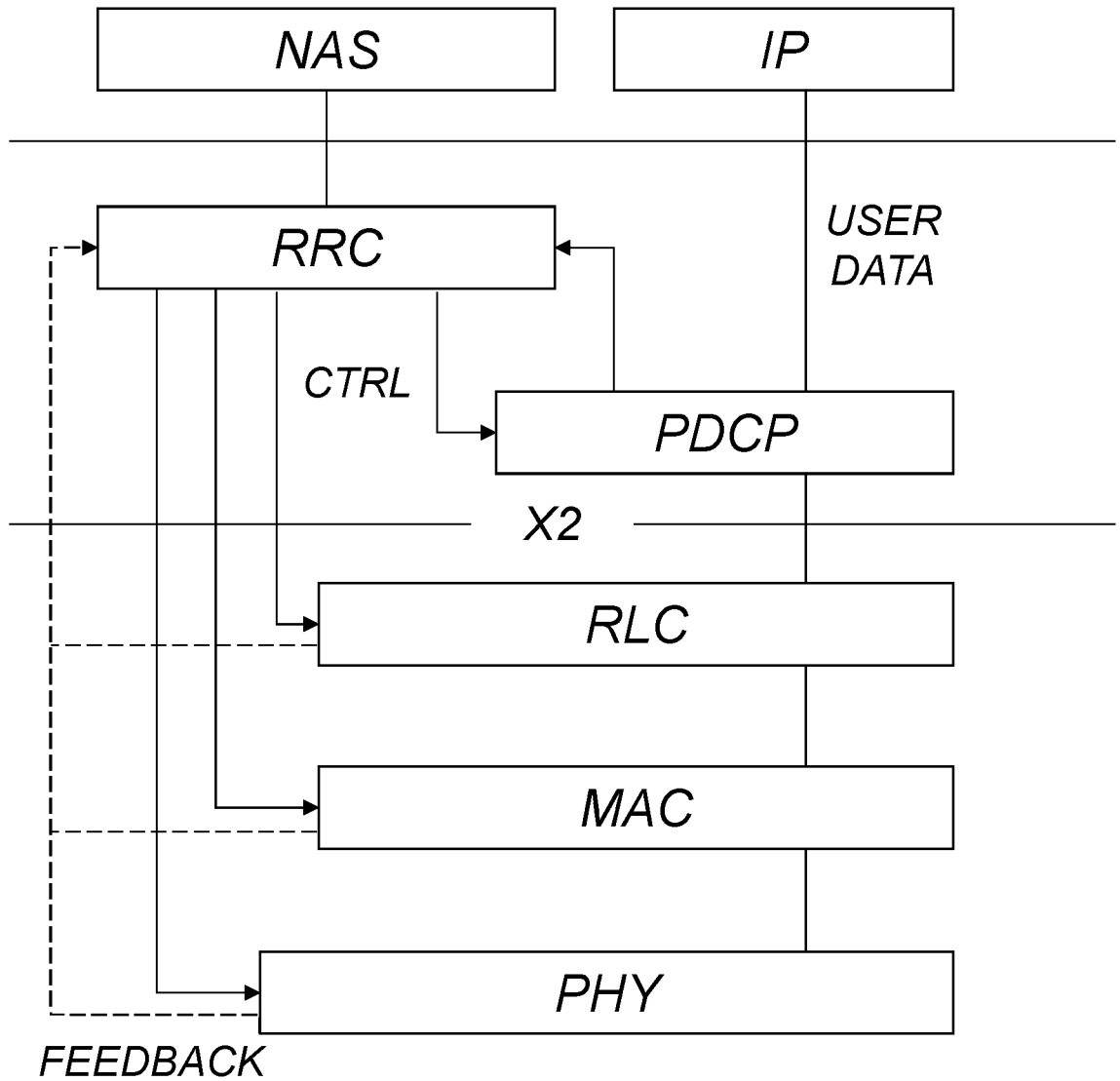
FIG. 2 is a schematic diagram illustrating an example of a split of the protocol stack including an X2 interface between lower and higher layers and/or sub-layers of the protocol stack according to an embodiment.

FIG. 2 is a schematic diagram illustrating an example of a split of the protocol stack including an X2 interface between lower and higher layers and/or sub-layers of the protocol stack according to an embodiment. In this particular example, the protocol stack is split between PDCP and RLC and the X2 interface is indicated as the interface for use between the various protocol layers and/or sub-layers. By way of example, the X2 interface may be used for transfer of control signaling (via X2AP/X2U), user data (via the X2 User Plane) and/or measurement feedback information. For example, it can be noted that PDCP may be connected to the lower layers and/or sublayers via X2U.

Figure 3:
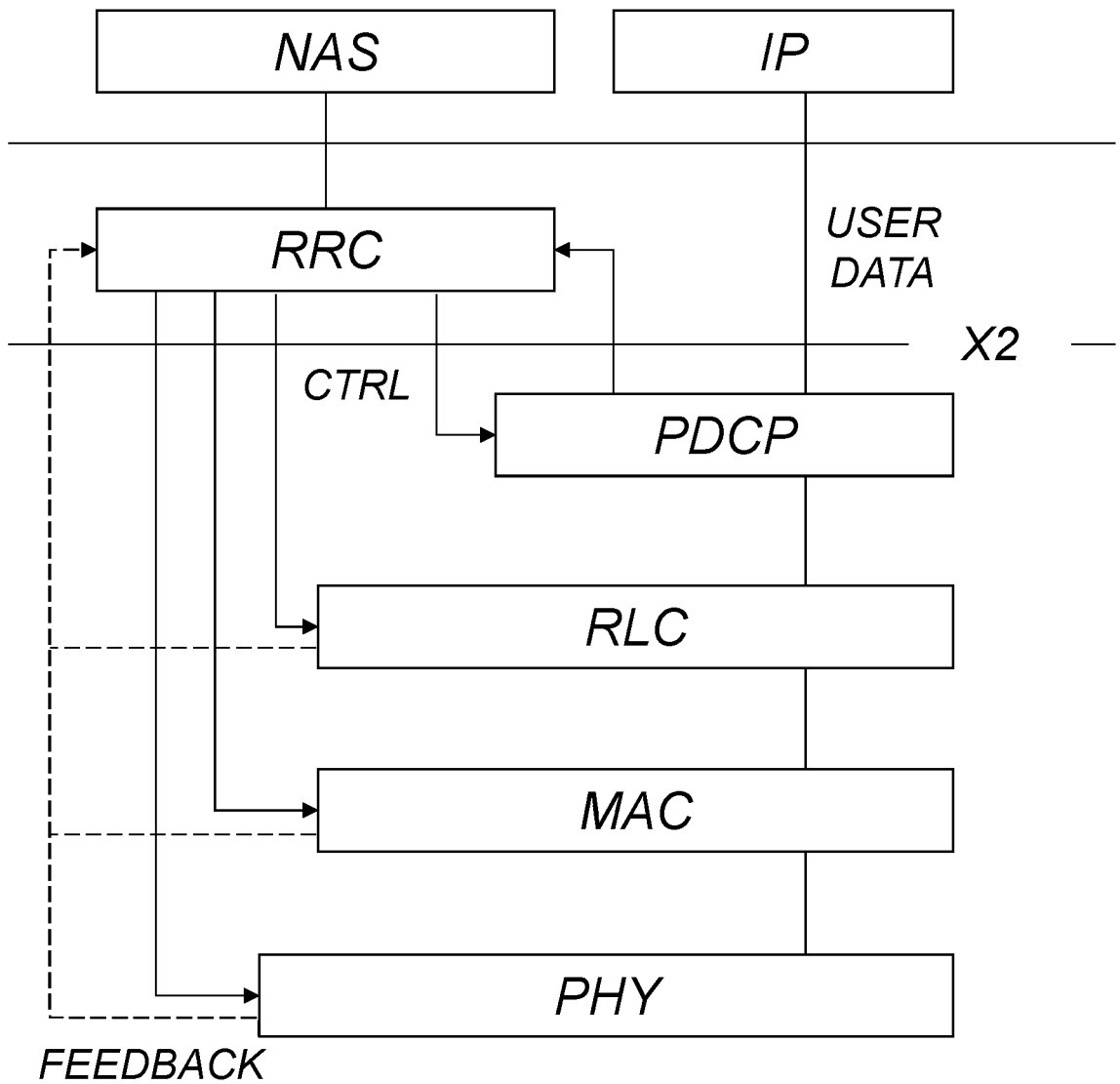
FIG. 3 is a schematic diagram illustrating an example of another split of the protocol stack including an X2 interface between lower and higher layers and/or sub-layers of the protocol stack according to an alternative embodiment.

FIG. 3 is a schematic diagram illustrating an example of another split of the protocol stack including an X2 interface between lower and higher layers and/or sub-layers of the protocol stack according to an alternative embodiment. In this particular example, the protocol stack is split between RRC and PDCP. In a sense, this example represents a L3-L2 split via X2.

Figure 4:
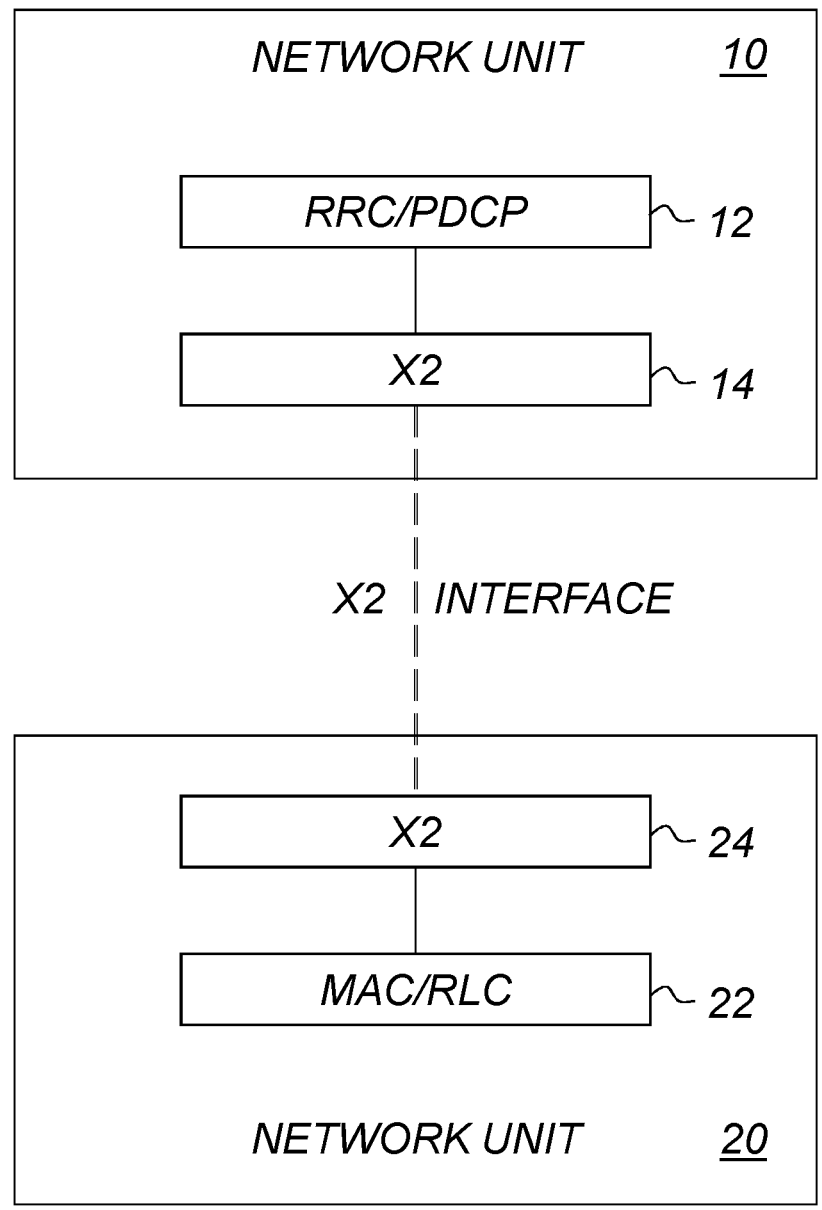
FIG. 4 is a schematic diagram illustrating an example of a RRC/PDCP network unit connected to a MAC/RLC network unit via an X2 interface according to an embodiment.

FIG. 4 is a schematic diagram illustrating an example of a RRC/PDCP network unit connected to a MAC/RLC network unit via an X2 interface according to an embodiment.

The network units 10 and 20 are typically remotely located, and from the perspective of one of the network units, the other network unit is therefore referred to as a remote network unit.

In each case, the considered network unit and the remote network unit are individual network units that are remotely located. The remote network unit can thus simply be regarded as another individual network unit.

In other words, the network units are typically provided in separate locations, preferably in geographically distant locations, and communicatively coupled.

Each network unit may even be regarded as a network function, e.g. a Virtual Network Function, VNF. The network functions may be provided in individual entities, which preferably are remotely located but communicatively coupled to each other.

For simplicity, the network unit 10 may sometimes be referred to as the RRC/PDCP network unit and the network unit 20 as the MAC/RLC network unit in the following.

RRC/PDCP Network Unit

There is provided a network unit 10 for a wireless communication system, wherein the network unit is configured to provide Radio Resource Control, RRC, and/or Packet Data Convergence Protocol, PDCP, protocol functionality 12, and the network unit 10 comprises an X2 unit 14 configured to provide an X2 interface between the RRC and/or PDCP protocol functionality of the network unit 10 and lower protocol layer(s) and/or sub-layer(s) of the remote network unit 20.

The lower protocol layer(s) and/or sub-layer(s) may include Radio Link Control, RLC, and/or Medium Access Control, MAC, protocol functionality.

By way of example, the network unit 10 may be configured to provide RRC and PDCP protocol functionality, and the lower protocol layer(s) and/or sub-layer(s) of the remote network unit 20 may include RLC and MAC protocol functionality.

In another example, the network unit 10 may be configured to provide RRC protocol functionality, and the lower protocol layer(s) and/or sub-layer(s) of the remote network unit 20 may include PDCP, RLC and MAC protocol functionality.

For example, the X2 unit 14 may be configured to provide the X2 interface for transfer of control signaling, user data and/or measurement feedback information, wherein the X2 interface includes an X2 Application Protocol, X2AP, interface and/or an X2 User, X2U, interface.

In a particular example, the X2 unit 14 is configured to provide the X2 interface for transfer of at least one of RRC control signaling, Non-Access Stratum, NAS, control signaling and base station Control Management signaling between the network unit 10 and the remote network unit 20.

As an example, the X2 unit 14 may be configured to send and/or receive an X2AP message having an information element, IE, denoted Transparent Packet Data Unit, Transparent PDU, including an RRC PDU, NAS PDU and/or Control Management PDU for transparently sending and/or receiving the RRC PDU, NAS PDU and/or Control Management PDU to/from the remote network unit 20 via the X2 interface.

In this example, the X2 unit 14 is preferably configured to send and/or receive an X2AP message having an information element, IE, denoted Transparent PDU Type indicating type of content of the Transparent PDU IE.

MAC/RLC Network Unit

There is also provided a network unit 20 for a wireless communication system, wherein the network unit is configured to provide Radio Link Control, RLC, and/or Medium Access Control, MAC, protocol functionality 22, and the network unit comprises an X2 unit 24 configured to provide an X2 interface between the RLC and/or MAC protocol functionality of the network unit 20 and higher protocol layer(s) and/or sub-layer(s) of the remote network unit 10.

By way of example, the higher protocol layer(s) and/or sub-layer(s) may include Radio Resource Control, RRC, and/or Packet Data Convergence Protocol, PDCP, protocol functionality.

In another example, the network unit 20 is configured to provide RLC and MAC protocol functionality, and the higher protocol layer(s) and/or sub-layer(s) of the remote network unit 10 may include RRC and PDCP protocol functionality.

For example, the network unit 20 may be configured to provide PDCP, RLC and MAC protocol functionality, and the higher protocol layer(s) and/or sub-layer(s) of the remote network unit 10 may include RRC protocol functionality. In this example, the network unit 20 should strictly speaking be referred to as a MAC/RLC/PDCP network unit, but for simplicity it will be referred to as the network unit 20 or the MAC/RLC network unit.

In a particular example, the X2 unit 24 is configured to provide the X2 interface for transfer of control signaling, user data and/or measurement feedback information, wherein the X2 interface includes an X2 Application Protocol, X2AP, interface and/or an X2 User, X2U, interface.

As an example, the X2 unit 24 may be configured to provide the X2 interface for transfer of at least one of RRC control signaling, Non-Access Stratum, NAS, control signaling and base station Control Management signaling between the network unit 20 and the remote network unit 10.

By way of example, the X2 unit 24 may be configured to send and/or receive an X2AP message having an information element, IE, denoted Transparent Packet Data unit, Transparent PDU, including an RRC PDU, NAS PDU and/or Control Management PDU for transparently sending and/or receiving the RRC PDU, NAS PDU and/or Control Management PDU to/from the remote network unit 10.

In this example, the X2 unit 24 may be configured to send and/or receive an X2AP message having an information element, IE, denoted Transparent PDU Type indicating type of content of the Transparent PDU IE.

As mentioned, the network unit(s) may be used to support efficient connection establishment, for radio access with a radio unit, for a wireless communication device camping in the coverage area thereof. By way of example, the proposed technology may allow wireless communication devices to camp on and connect through remote radio units not having higher protocol layer or sub-layer functions. For example, this may provide a satisfactory solution for integrating 5G radio units with existing wireless communication systems.

Figure 5:
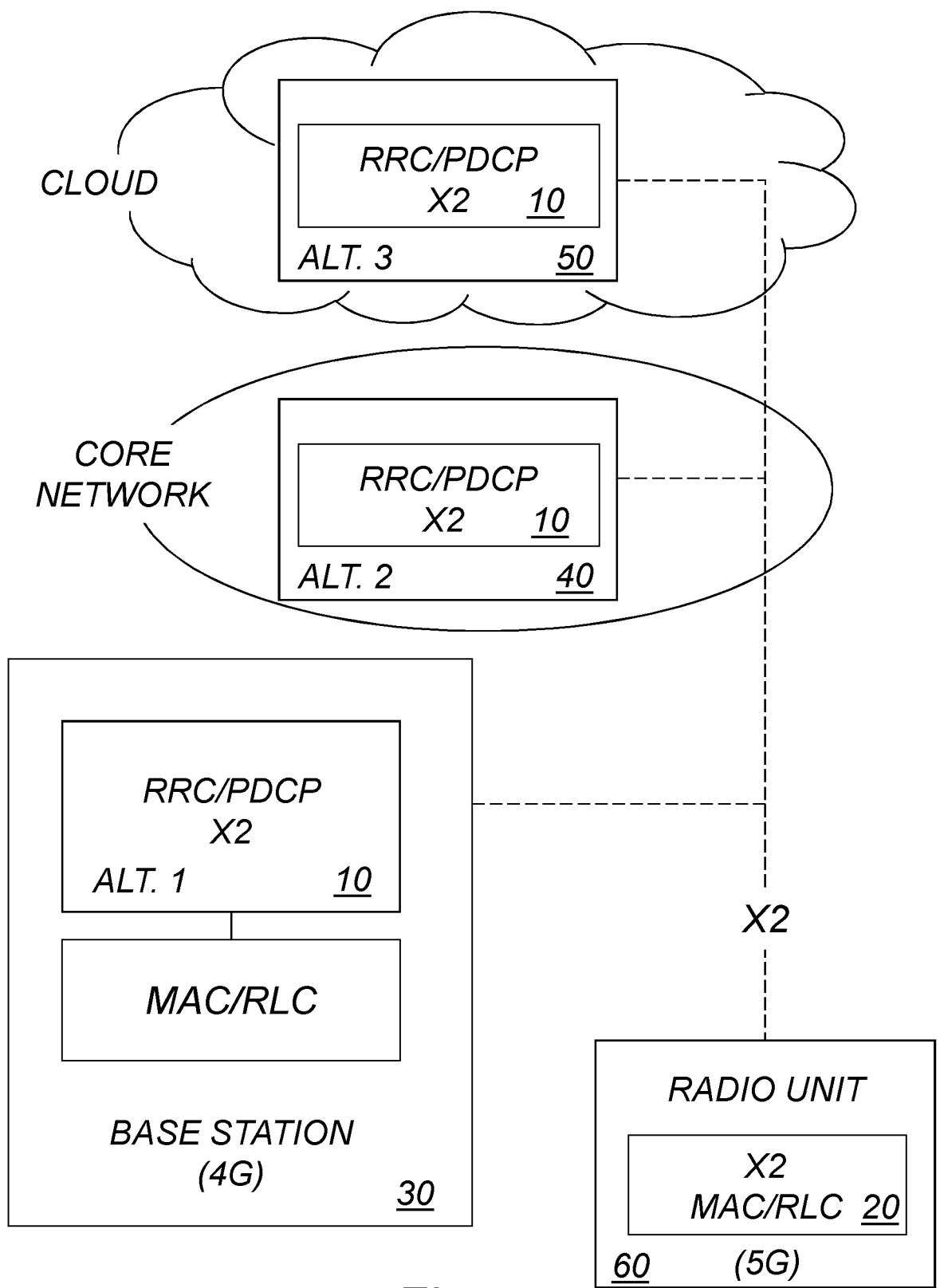
FIG. 5 is a schematic diagram illustrating an example of a remote radio unit connected via an X2 interface to higher protocol layer(s) and/or sub-layer(s) located in various alternative network units.

FIG. 5 is a schematic diagram illustrating an example of a remote radio unit connected via an X2 interface to higher protocol layer(s) and/or sub-layer(s) located in various alternative network units.

The network unit 10 may be configured to send and/or receive control signaling to/from the lower protocol layer(s) and/or sub-layer(s) of the remote network unit 20, the remote network unit 20 being part of a radio unit 60 in a radio access network, via the X2 interface to support connection establishment, for radio access with the radio unit, for a wireless communication device camping in the coverage area of the radio unit.

For example, the network unit 10 may be provided for location in a base station 30 (alternative 1 in FIG. 5) configured for operation based on a radio access technology, such as 4G, and the remote network unit 20 may be part of a radio unit 60, which is configured for operation based on a different radio access technology such as 5G.

Alternatively, the network unit 10 may be provided for location in a core network unit 40 (alternative 2 in FIG. 5) or in a cloud-based network device 50 (alternative 3 in FIG. 5) and the remote network unit 20 is part of the radio unit 60.

The network unit 20 is typically provided for location in a radio unit 60 and configured to send and/or receive control signaling to/from the higher protocol layer(s) and/or sub-layer(s) of the network unit 10 via the X2 interface to support connection establishment, for radio access with the radio unit 60, for a wireless communication device camping in the coverage area of the radio unit.

As indicated, the network unit 20 may be provided for location in the radio unit 60, which is configured for operation based on a radio access technology, such as 5G, and the network unit 10 is part of a base station 30, which is configured for operation based on a different radio access technology such as 4G.

Alternatively, the network unit 20 is provided for location in the radio unit 60 in a radio access network and the network unit 10 is part of a core network unit 40 or part of a cloud-based network device 50.

As mentioned, the network unit(s) may also be used to provide an efficient interface between remote units of a distributed base station.

Figure 6:
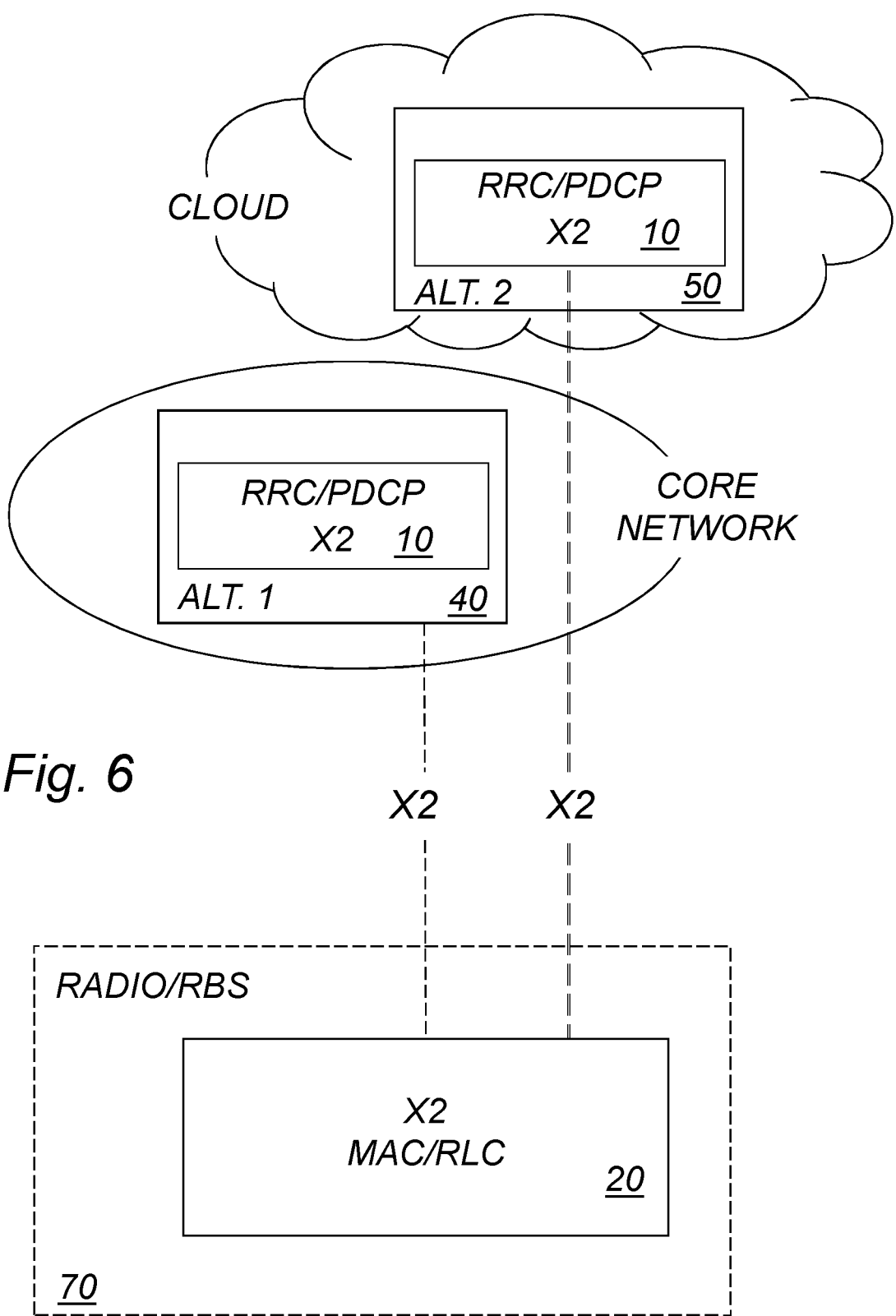
FIG. 6 is a schematic diagram illustrating an example of a distributed base station in which remote units implementing different protocol layers and/or sub-layers are interconnected via an X2 interface.

FIG. 6 is a schematic diagram illustrating an example of a distributed base station in which remote units implementing different protocol layers and/or sub-layers are interconnected via an X2 interface.

In this example, the network unit 10 and the remote network unit 20 are parts of a distributed base station, and the network unit 10 is configured to send and/or receive control signaling to/from the lower protocol layer(s) and/or sub-layer(s) of the remote network unit 20 via the X2 interface as part of operating the distributed base station.

By way of example, the network unit 10 is provided for location in a core network unit 40 (alternative 1 in FIG. 6) or in a cloud-based network device 50 (alternative 2 in FIG. 6), and the remote network unit 20 is part of a radio unit 70 for location in a radio access network.

Analogously, from the perspective of the network unit 20, the network unit 20 is configured to send and/or receive control signaling to/from the higher protocol layer(s) and/or sub-layer(s) of the remote network unit 10 via the X2 interface as part of operating the distributed base station.

By way of example, the network unit 20 is provided for location in a radio unit 70 in a radio access network, and the remote network unit 10 is part of a core network unit 40 (alternative 1 in FIG. 6) or part of a cloud-based network device 50 (alternative 2 in FIG. 6).

Figure 7:
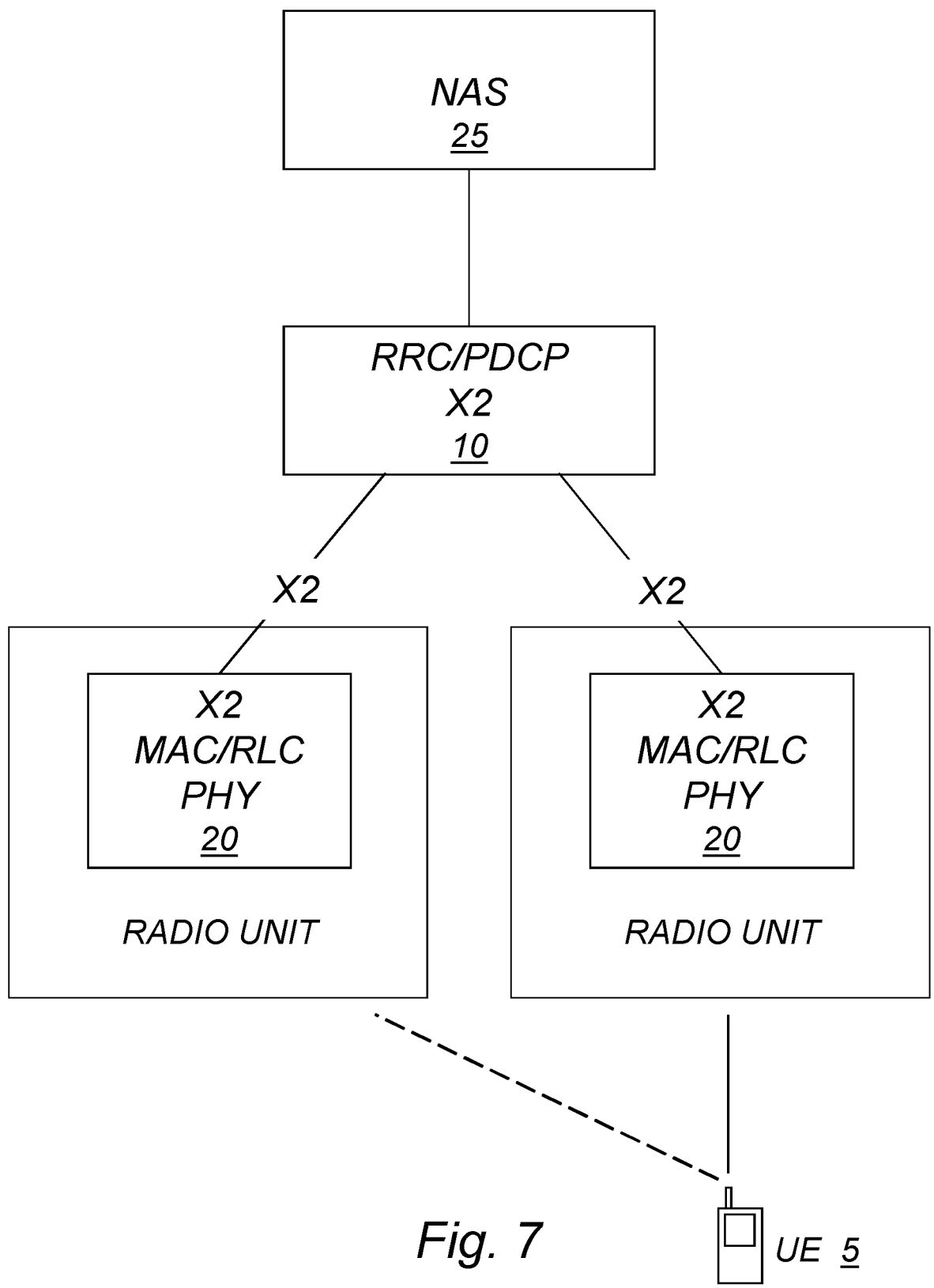
FIG. 7 is a schematic diagram illustrating an example of an architecture overview of a wireless communication system according to an embodiment.

Accordingly, there is provided a base station 30 comprising a network unit 10 as described herein. There is also provided a core network unit 40 comprising a network unit 10 as described herein. Further, there is provided a cloud-based network device 50 comprising a network unit 10 as described herein. There is also provided a radio unit 60; 70 comprising a network unit 20 as described herein FIG. 7 is a schematic diagram illustrating an example of an architecture overview of a wireless communication system according to an embodiment. In this particular example, a wireless communication device 5 such as a UE is served by at least one of a number of radio units, each of which has a network unit 20 implementing the PHY layer and MAC/RLC sub-layer(s) and X2 interface functionality. The radio units 20 communicate with a network unit 10 via X2 implementing RRC/PDCP sub-layer(s) and X2 interface functionality. The network unit 10 is further connected to a NAS device 25 to enable completion of the control plane between the UE and a Mobility Management Entity, MME.

For example, the core network may provide the NAS level functions and is connected to the radio access network through the S1-AP protocol. In this example, the RRC/PDCP network unit 10 provides RRC Connectivity and higher layer mechanisms, it is connected to the lower layers via X2 interface(s). The radio units provide lower layer connectivity, and the UE 5 may connect to the radio access network through one or more radio units and/or base stations of the same or 10 different radio technologies.

Figure 8:
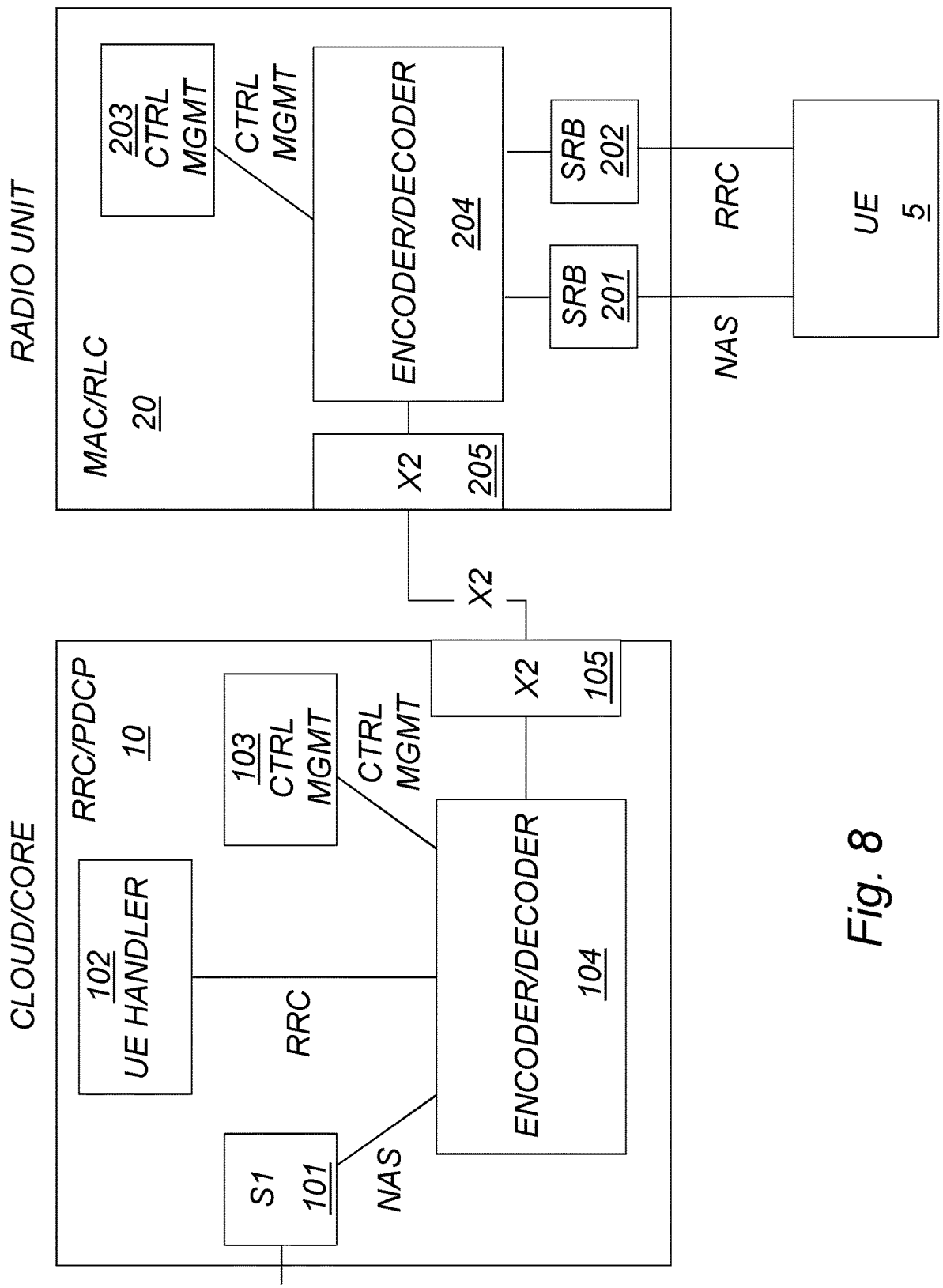
FIG. 8 is a schematic diagram illustrating an example of an implementation of a distributed base station according to an embodiment.

FIG. 8 is a schematic diagram illustrating an example of an implementation of a distributed base station according to an embodiment.

In this example the RRC/PDCP network unit 10 includes an S1 unit 101, a UE handler 102, a base station Control Management unit 103, an encoder/decoder 104, and an X2 unit 105. The network unit 10 may for example be implemented in the core network or in a cloud-based environment. The encoder/decoder 104 may be configured for encoding/encapsulating and/or decoding/decapsulating NAS, RRC and/or Control Management control signaling for transparent transfer and reception via X2 to/from the remote MAC/RLC network unit 20.

Figure 9:
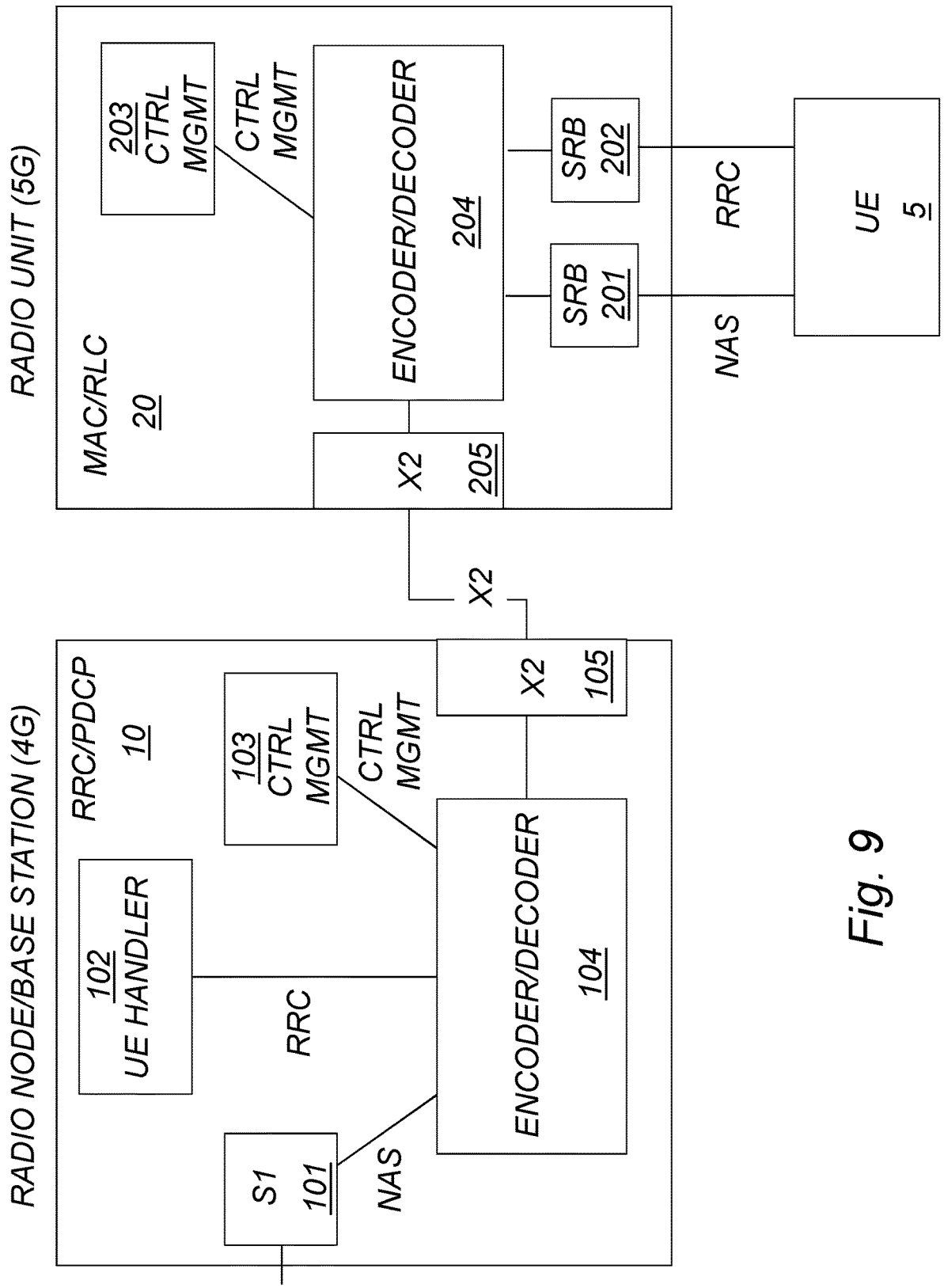
FIG. 9 is a schematic diagram illustrating an example of a MAC/RLC radio unit of a given radio access technology interfacing higher protocol layer(s) and/or sub-layer(s) a radio node/base station of another radio access technology according to an embodiment.

In this example, the MAC/RLC network unit 20 includes service radio bearer units, SRBs, 201, 202, a base station Control Management unit 203, an encoder/decoder 204, and an X2 unit 205. The encoder/decoder 204 may be configured for encoding/encapsulating and/or decoding/decapsulating NAS, RRC and/or Control Management control signaling for transparent reception and transfer via X2 to/from the RRC/PDCP network unit 10. The SRB units 210, 202 are configured for transferring and receiving NAS and RRC signaling, respectively to/from the UE 5. FIG. 9 is a schematic diagram illustrating an example of a MAC/RLC radio unit of a given radio access technology interfacing higher protocol layer(s) and/or sub-layer(s) a radio node/base station of another radio access technology according to an embodiment. This example differs from that of FIG. 8 in that the MAC/RLC network unit 20 is located in a radio unit of a radio access technology, such as 5G, that differs from the radio access technology, such as 4G, of the radio node/base station in which the RRC/PDCP network unit 10 is located. The network units 10, 20 are configured to allow wireless communication devices such as UE 5 to camp on and connect through a remote radio unit not having higher protocol layer or sub-layer functions. For example, this may provide a satisfactory solution for integrating 5G radio units with existing wireless communication systems.

This may be particularly useful in situations where a UE in Idle mode is in the coverage area of a 5G radio unit, but not in the coverage area of the 4G base station.

The proposed technology will of course also be useful if it is desired to use the 5G radio unit as a booster to the 4G base station, where Dual Connectivity procedures can be used to establish and maintain connectivity legs with different radio nodes/units.

Figure 10:
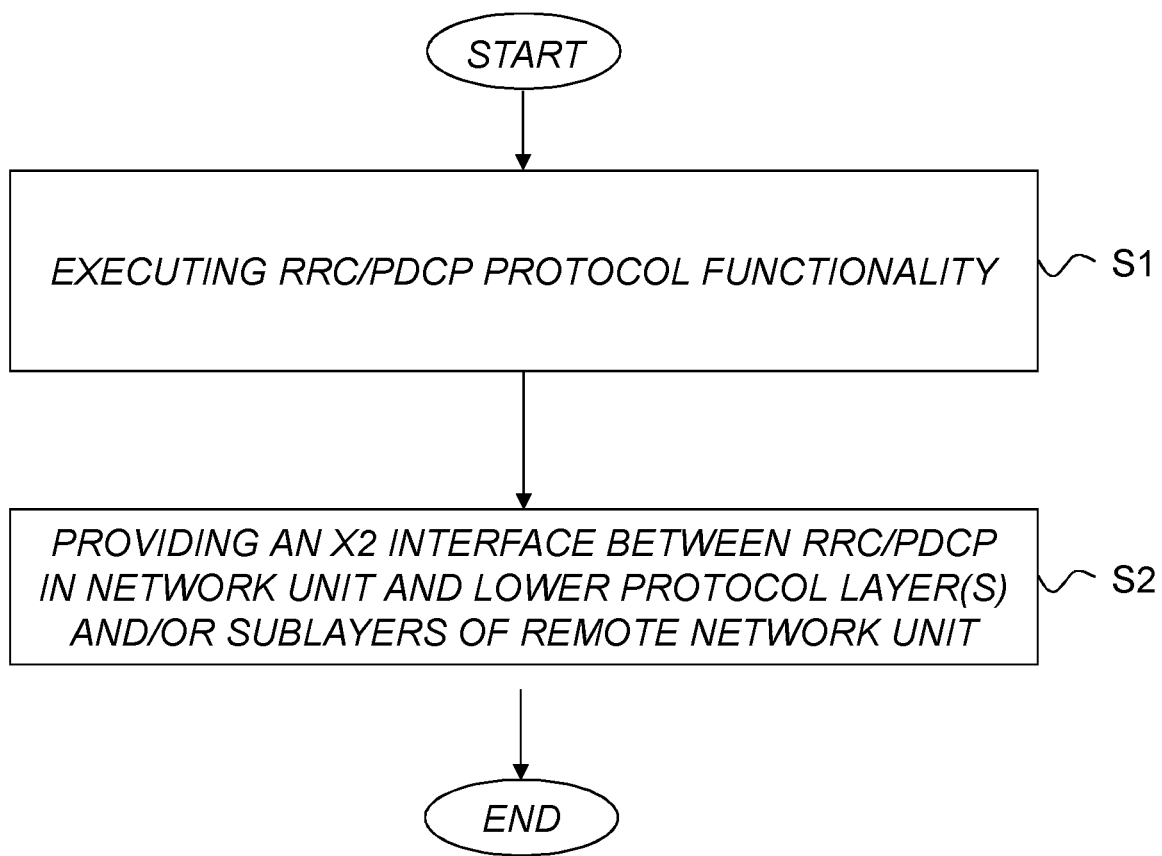
FIG. 10 is a schematic flow diagram illustrating an example of a method of operating a network unit according to an embodiment.

FIG. 10 is a schematic flow diagram illustrating an example of a method of operating a network unit according to an embodiment.

The method comprises:

S1: executing Radio Resource Control, RRC, and/or Packet Data Convergence Protocol, PDCP, protocol functionality; and S2: providing an X2 interface between said RRC and/or PDCP protocol functionality of said network unit and lower protocol layer(s) and/or sub-layer(s) of another remote network unit.

By way of example, the lower protocol layer(s) and/or sub-layer(s) includes Radio Link Control, RLC, and/or Medium Access Control, MAC, protocol functionality.

In a particular example, the executing step S1 comprises executing both RRC and PDCP protocol functionality. In this case, the lower protocol layer(s) and/or sub-layer(s) of the remote network unit preferably includes RLC and MAC protocol functionality.

In another example, the executing step S1 comprises executing RRC protocol functionality. In this case, the lower protocol layer(s) and/or sub-layer(s) of the remote network unit includes PDCP, RLC and MAC protocol functionality.

For example, the method may further comprise sending and/or receiving, via the X2AP interface, control signaling, user data and/or measurement feedback information, wherein the X2 interface includes an X2 Application Protocol, X2AP, interface and/or an X2 User, X2U, interface.

More specifically, the sending and/or receiving step may e.g. comprise sending and/or receiving at least one of RRC control signaling, Non-Access Stratum, NAS, control signaling and base station Control Management signaling to/from the remote network unit.

In a particular example, the sending and/or receiving step comprises sending and/or receiving an X2AP message having an information element, IE, denoted Transparent Packet Data unit, Transparent PDU, including an RRC PDU, NAS PDU and/or Control Management PDU for transparently sending and/or receiving the RRC PDU, NAS PDU and/or Control Management PDU to/from the remote network unit via the X2 interface.

In this example, the sending and/or receiving step may comprise sending and/or receiving an X2AP message having an information element, IE, denoted Transparent PDU Type indicating type of content of the Transparent PDU IE.

As an example, the method may comprise the step of sending and/or receiving control signaling to/from the lower protocol layer(s) and/or sub-layer(s) of the remote network unit, the remote network unit being part of a radio unit in a radio access network, via the X2 interface to support connection establishment, for radio access with the radio unit, for a wireless communication device camping in the coverage area of the radio unit.

In another example, the network unit and the remote network unit are parts of a distributed base station, and the method may comprise the step of sending and/or receiving control signaling to/from the lower protocol layer(s) and/or sub-layer(s) of the remote network unit via the X2 interface as part of operating the distributed base station.

Figure 11:
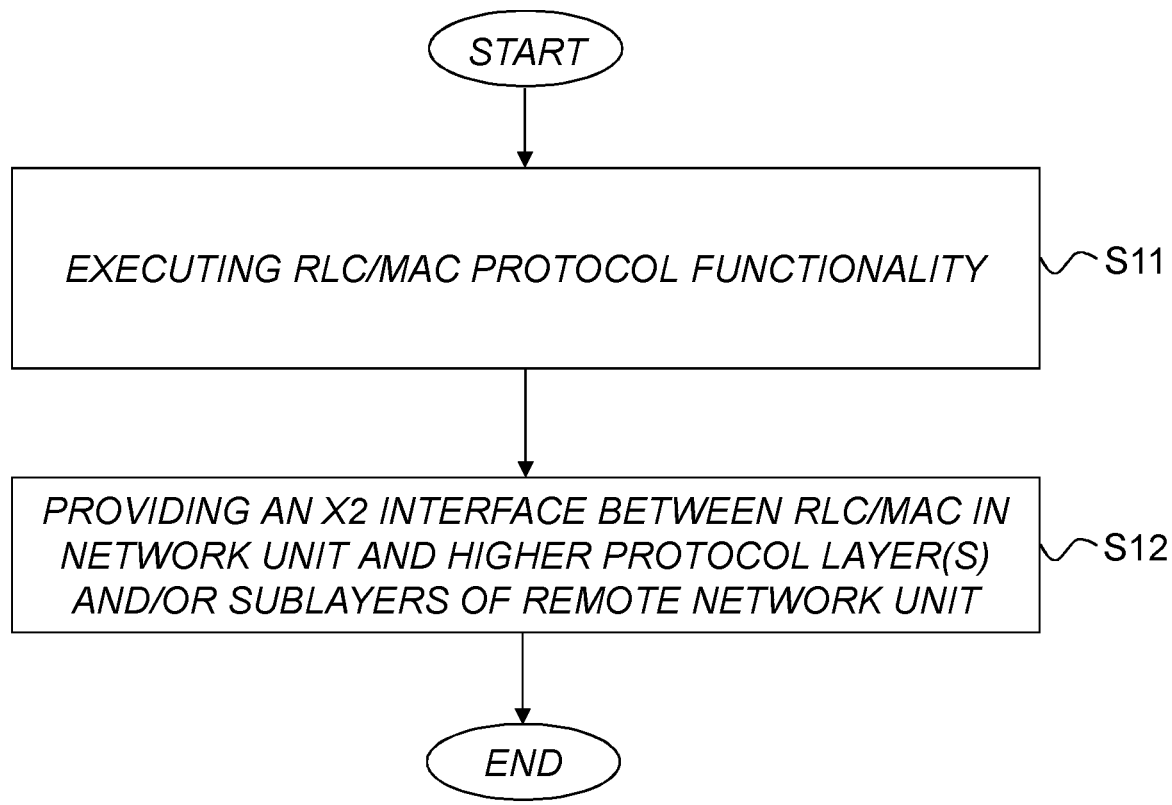
FIG. 11 is a schematic flow diagram illustrating an example of another method of operating a network unit according to an embodiment.

FIG. 11 is a schematic flow diagram illustrating an example of another method of operating a network unit according to an embodiment.

The method comprises:

S11: executing Radio Link Control, RLC, and/or Medium Access Control, MAC, protocol functionality; and S12: providing an X2 interface between the RLC and/or MAC protocol functionality of the network unit and higher protocol layer(s) and/or sub-layer(s) of another remote network unit.

By way of example, the higher protocol layer(s) and/or sub-layer(s) includes Radio Resource Control, RRC, and/or Packet Data Convergence Protocol, PDCP, protocol functionality.

In a particular example, the executing step S11 comprises executing both RLC and MAC protocol functionality. In this case, the higher protocol layer(s) and/or sub-layer(s) of the remote network unit includes RRC and PDCP protocol functionality.

In another example, the executing step S11 comprises executing PDCP, RLC and MAC protocol functionality. In this case, the higher protocol layer(s) and/or sub-layer(s) of the remote network unit includes RRC protocol functionality.

By way of example, the method may further comprise sending and/or receiving, via the X2AP interface, control signaling, user data and/or measurement feedback information, wherein the X2 interface includes an X2 Application Protocol, X2AP, interface and/or an X2 User, X2U, interface.

More specifically, the sending and/or receiving step may e.g. comprise sending and/or receiving at least one of RRC control signaling, Non-Access Stratum, NAS, control signaling and base station Control Management signaling to/from the remote network unit.

In a particular example, the sending and/or receiving step comprises sending and/or receiving an X2AP message having an information element, IE, denoted Transparent Packet Data unit, Transparent PDU, including an RRC PDU, NAS PDU and/or Control Management PDU for transparently sending and/or receiving the RRC PDU, NAS PDU and/or Control Management PDU to/from the remote network unit.

In this example, the transferring step may comprise sending and/or receiving an X2AP message having an information element, IE, denoted Transparent PDU Type indicating type of content of the Transparent PDU IE.

As an example, the network unit may be provided for location in a radio unit, and the method may comprise the step of sending and/or receiving control signaling to/from the higher protocol layer(s) and/or sub-layer(s) of the remote network unit via the X2 interface to support connection establishment, for radio access with the radio unit, for a wireless communication device camping in the coverage area of the radio unit.

In another example, the network unit and the remote network unit are parts of a distributed base station, and the method may comprise the step of sending and/or receiving control signaling to/from the higher protocol layer(s) and/or sub-layer(s) of the remote network unit via the X2 interface as part of operating the distributed base station.

For a better understanding, the proposed technology may be described with reference to few particular, non-limiting examples below. It should though be understood that the inventions is not limited thereto.

These procedures would transparently transport the higher layer protocol data (e.g. RRC and NAS signaling) between the radio node and the higher layers.

As mentioned, the proposed technology may allow wireless communication devices to camp on and connect through remote radio units not having higher protocol layer or sub-layer functions. For example, this may provide a satisfactory solution for integrating 5G radio units with existing wireless communication systems.

In this respect, an advantage of the solution is that already existing LTE protocols can be used to connect e.g. 5G radio nodes. In other words, the higher layers for 4G and 5G would co-exist and at least partly utilize the same architectural software/hardware entities.

As already indicated, this may be particularly useful in situations where a UE in Idle mode is in the coverage area of a 5G radio unit, but not in the coverage area of the 4G base station.

Also, the solution would allow for booster cell type of deployments. For example, a macro cell may be holding UEs in Idle mode but when entering RRC Connected Mode the UEs can utilize "booster" radio units (e.g. 5G) to increase their bit rate. These "booster nodes" does not have to have a connection to the core network.

Figure 12:
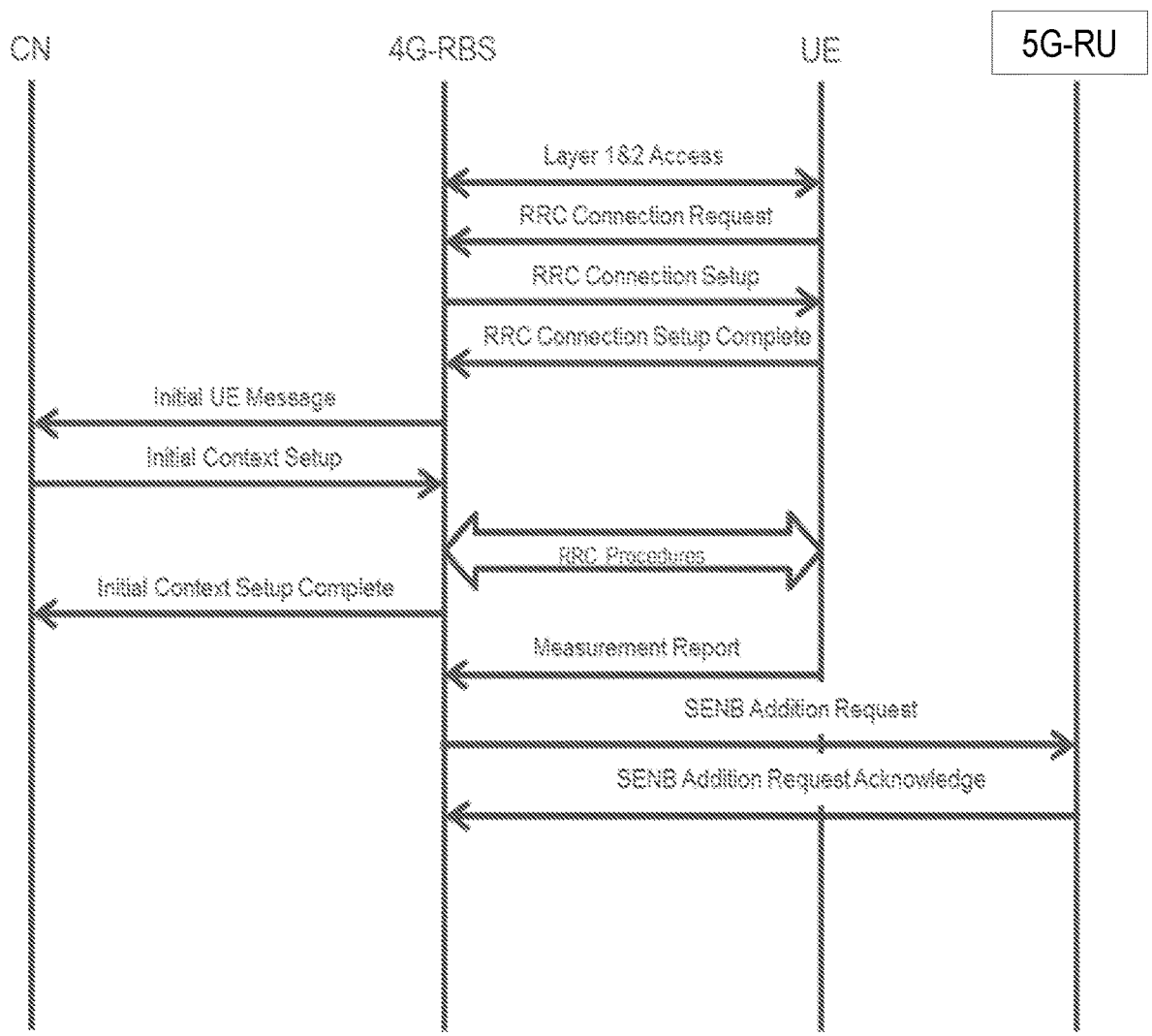
FIG. 12 is a schematic signaling diagram illustrating an example of how a 4G radio base station can serve a 5G radio node.

FIG. 12 is a schematic signaling diagram illustrating an example of how a 4G radio base station can serve a 5G radio node.

In FIG. 12, a UE is camping on the 4G network and is only adding 5G connectivity as a bitrate booster in Connected Mode. This example is only provided for completeness. First, a RRC Connection is established with the 4G base station, with accompanying UE Context Setup with the core network, followed by a Slave eNb, SENB, Addition Request and Request Acknowledge between the 4G base station and the 5G radio unit using X2AP Dual Connectivity procedures.

Figure 13:
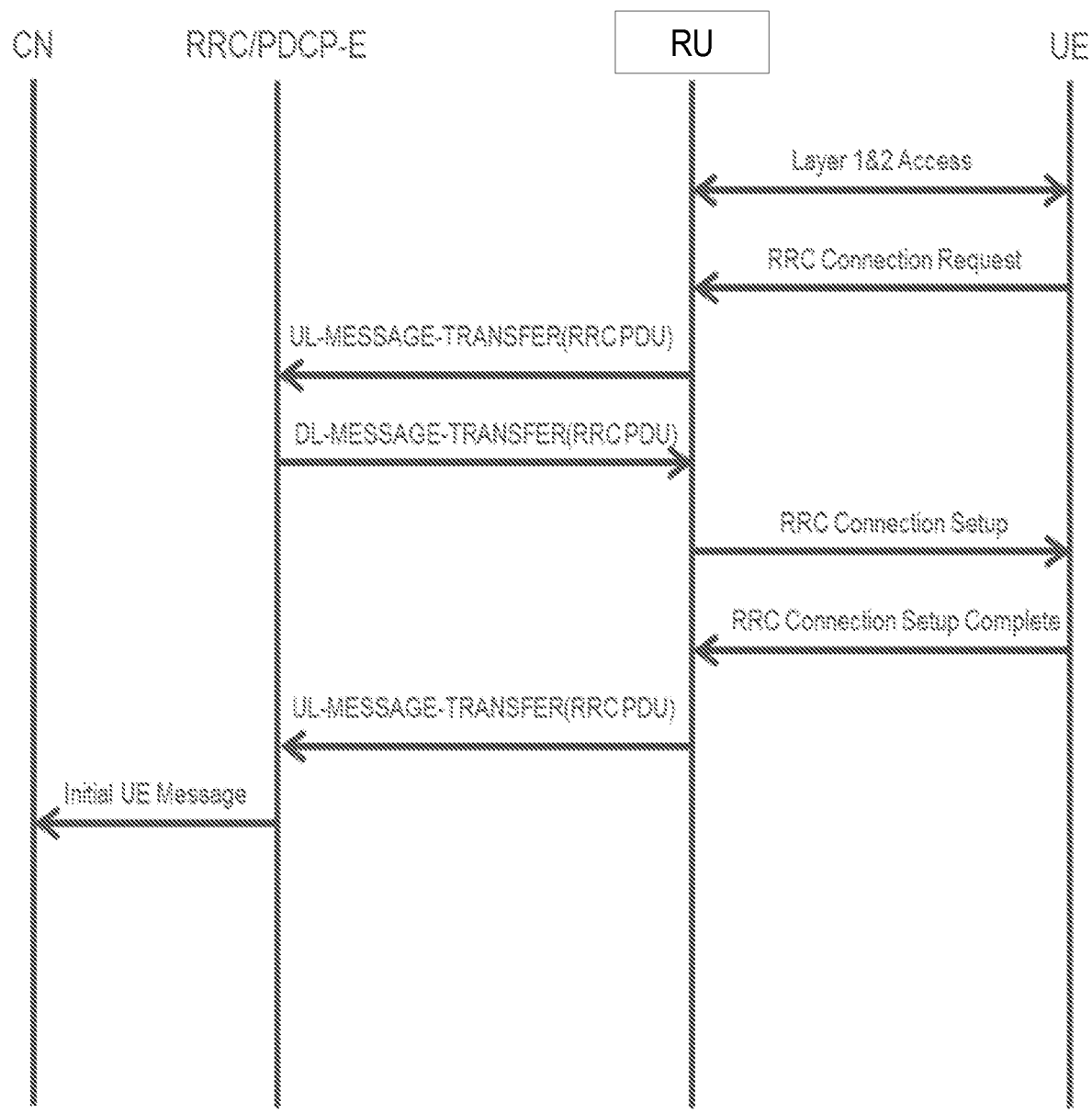
FIG. 13 is a schematic signaling diagram illustrating an example of X2 procedures that can be used to separate lower protocol layer(s) and/or sub-layer(s) from higher layer(s) and/or sub-layer(s) while allowing wireless communication devices such as UEs to camp on and connect through remote radio units not having higher layer or sub-layer functions.

FIG. 13 is a schematic signaling diagram illustrating an example of X2 procedures that can be used to separate lower protocol layer(s) and/or sub-layer(s) from higher layer(s) and/or sub-layer(s) while allowing wireless communication devices such as UEs to camp on and connect through remote radio units not having higher layer or sub-layer functions.

In this example, the relevant RRC signaling related to a given UE may be transparently transferred between a radio unit RU and an RRC/PDCP entity, RRC/PDCP-E.

The RRC/PDCP entity can be a standalone node, co-located with the core network or located in a cloud environment, or co-located with one or more base stations.

As an example, the same addressing principles as is already being used over the X2AP protocol Dual Connectivity procedures (i.e. the SeNb Addition Request/Acknowledge signaling) could be used by the two nodes, i.e. the RU may act as a Slave eNb (in Dual Connectivity terms) and provide an SeNB UE X2AP ID in the UL-MESSAGE-TRANSFER message. The RRC/PDCP-E may, in turn, act as a Master eNb (in Dual Connectivity terms) and provide a MeNB UE X2AP ID in the DL-MESSAGE-TRANSFER.

The header of the messages would look approximately like described below:

In the first UL-MESSAGE-TRANSFER message, the MeNB UE X2AP ID may be set to Unavailable and in consecutive messages both identities may be used for identification of the UE in both nodes.

The Transparent PDU Type indicates the contents of the transparent message. I.e. if the content is of e.g. type RRC, NAS or Management PDU. The actual PDU is present in the Transparent PDU IE.

As used herein, the non-limiting terms "wireless communication device" and "User Equipment (UE)" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network unit" may refer to any unit or device located in connection with a communication network, including but not limited to units in access networks, core networks, cloud-based environments and similar network structures. In particular, the term "network unit" may refer to any network device suitable for implementing the relevant protocol layer(s) and/or sub-layer(s) discussed herein, and may for example be a radio unit, base station, access point, network control node, core network unit, cloud-based network device or suitable part thereof.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| SeNB UE X2AP ID | M | | eNB UE X2AP ID 9.2.24 | Allocated at the SeNB | YES | reject |
| Transparent PDU Type | M | | | | YES | reject |
| Transparent PDU | M | | | | YES | reject |

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 14:
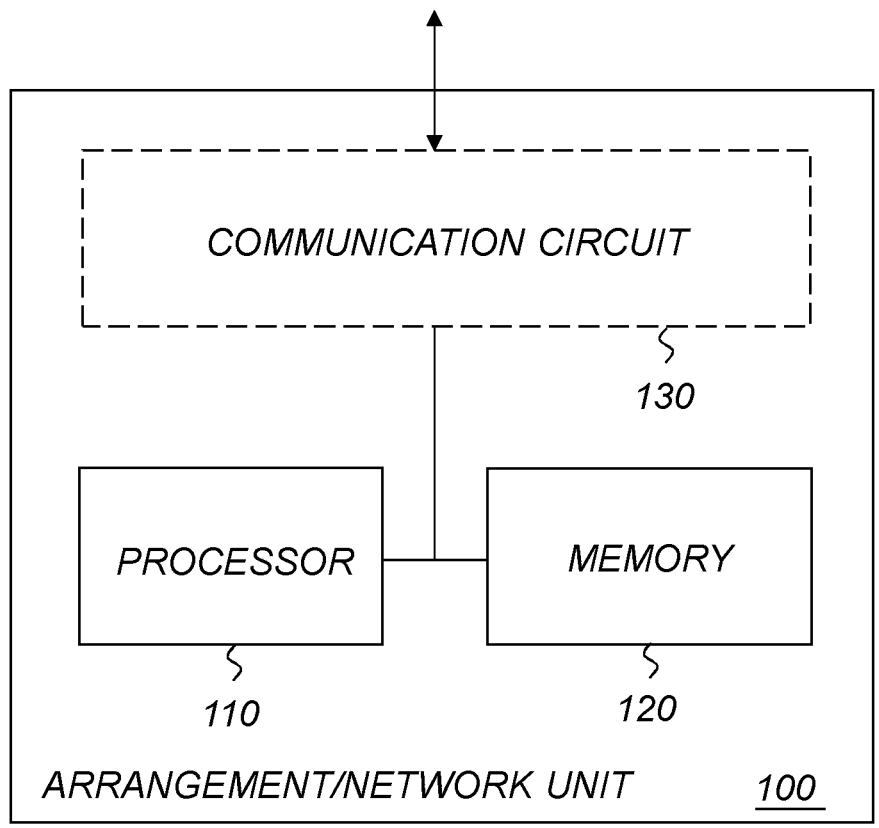
FIG. 14 is a schematic block diagram illustrating an example of a processor-memory implementation of an arrangement/network unit according to an embodiment.

FIG. 14 is a schematic block diagram illustrating an example of a processor-memory implementation of an arrangement/network unit according to an embodiment.

In a particular example, the arrangement/network unit 100 comprises a processor 110 and a memory 120, the memory 120 comprising instructions executable by the processor 110, whereby the processor is operative to provide the RRC and/or PDCP protocol functionality and to enable implementation of the X2 unit for providing the X2 interface.

In another example, the arrangement/network unit 100 comprises a processor 110 and a memory 120, the memory 120 comprising instructions executable by the processor 110, whereby the processor is operative to provide the RLC and/or MAC protocol functionality and to enable implementation of the X2 unit for providing the X2 interface.

Optionally, the arrangement/system 100 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s).

Figure 15:
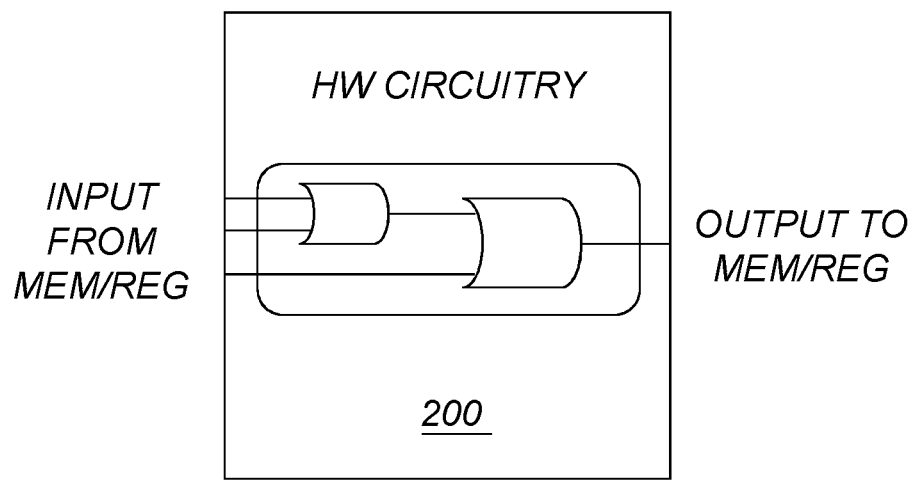
FIG. 15 is a schematic block diagram illustrating an example of an arrangement/network unit implemented by hardware circuitry according to an embodiment.

FIG. 15 is a schematic block diagram illustrating an example of an arrangement/network unit 200 implemented by hardware circuitry according to an embodiment. Particular examples of suitable hardware circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 16:
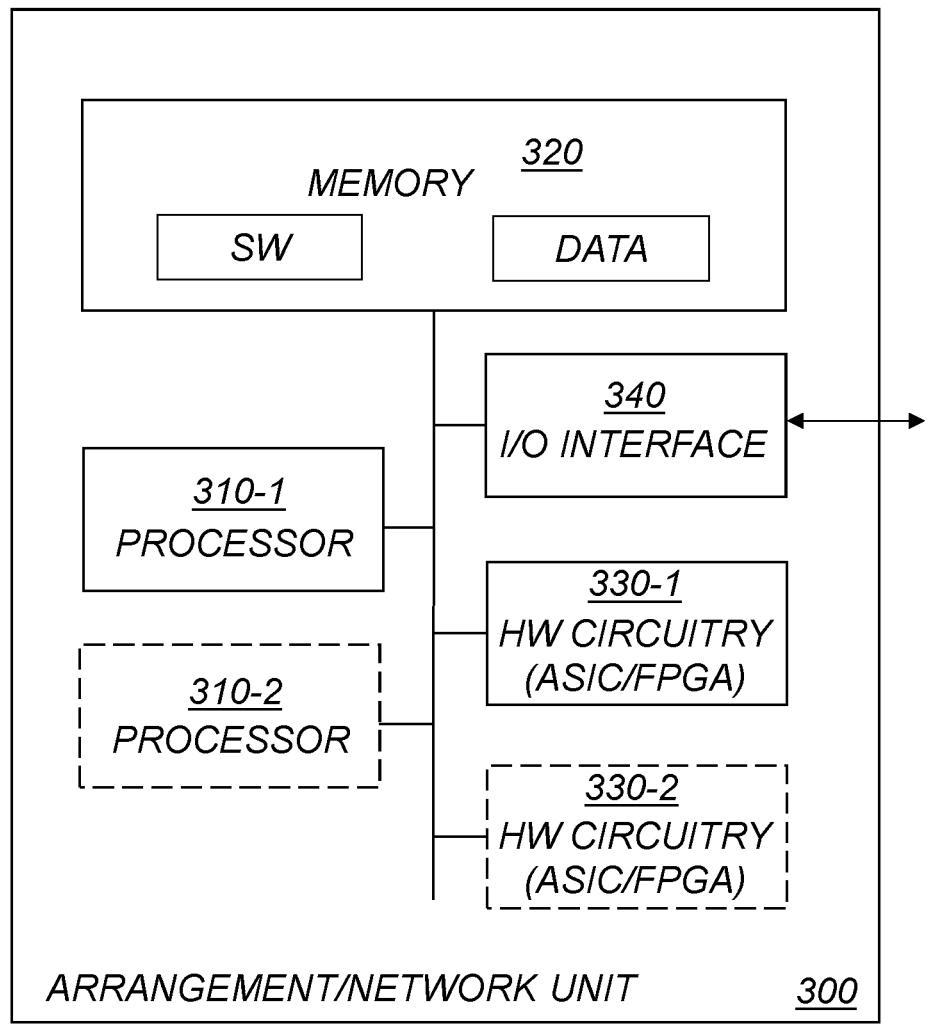
FIG. 16 is a schematic block diagram illustrating an example of an arrangement/network unit implemented by a combination of processor-memory and dedicated hardware circuitry according to an embodiment.

FIG. 16 is a schematic block diagram illustrating an example of an arrangement/network unit implemented by a combination of processor-memory and dedicated hardware circuitry according to an embodiment. In this example, the arrangement/network unit 300 is based on combination of both processor(s) 310-1, 310-2 and hardware circuitry 330-1, 330-2 in connection with suitable memory unit(s) 320. The arrangement 300 comprises one or more processors 310-1, 310-2, memory 320 including storage for software and data, and one or more units of hardware circuitry 330-1, 330-2 such as ASICs and/or FPGAs. The overall functionality is thus partitioned between programmed software, SW, for execution on one or more processors 310-1, 310-2, and one or more pre-configured or possibly reconfigurable hardware circuits 330-1, 330-2 such as ASICs and/or FPGAs. The arrangement/network unit 300 may also include an I/O interface 340. The actual hardware-software partitioning can be decided by a system designer based on a number of factors including processing speed, cost of implementation and other requirements.

Figure 17:
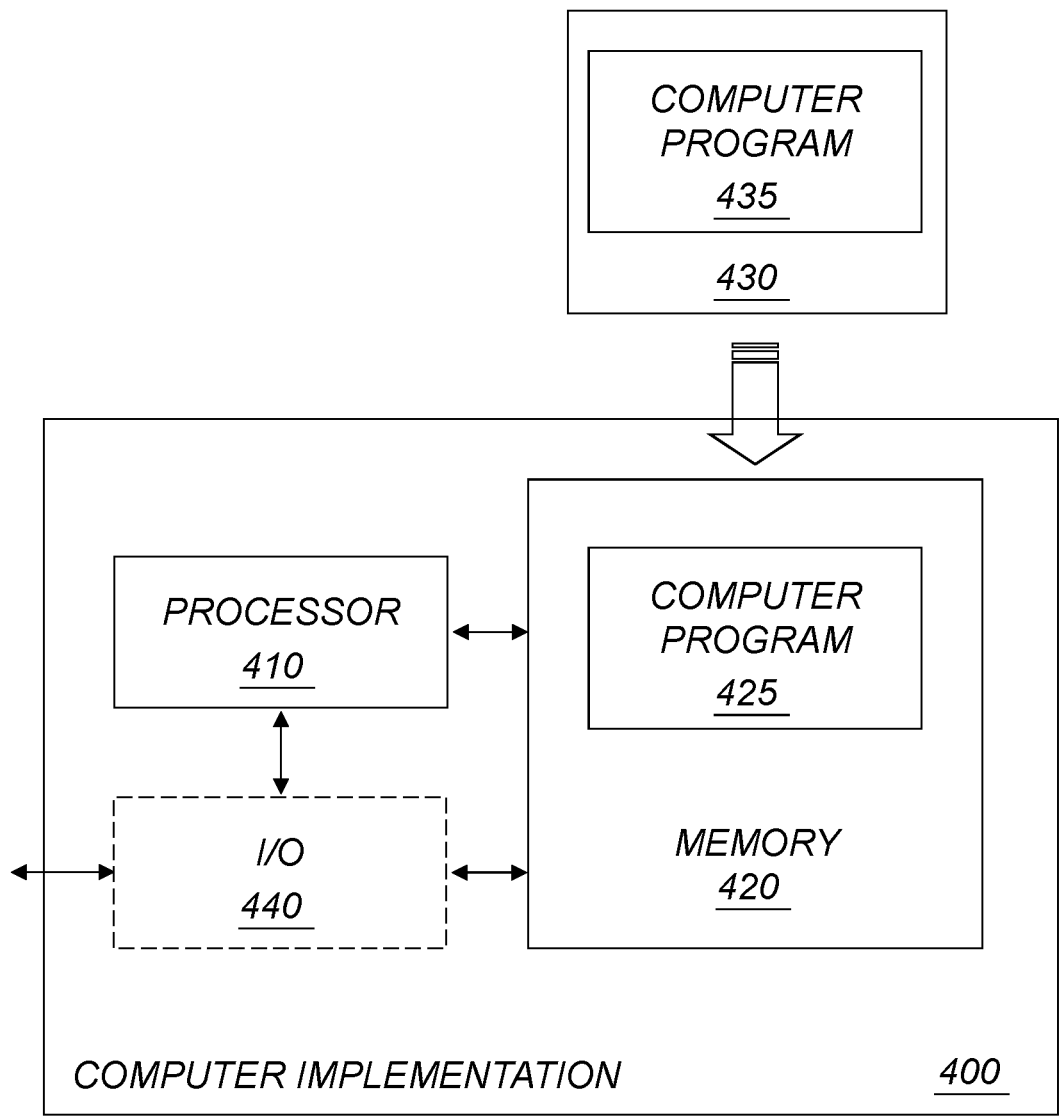
FIG. 17 is a schematic block diagram illustrating an example of a computer implementation according to an embodiment.

FIG. 17 is a schematic block diagram illustrating an example of a computer implementation 400 according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, the computer program 425; 435 comprises instructions, which when executed by at least one processor 410, cause the processor(s) 410 to:
 execute Radio Resource Control, RRC, and/or Packet Data Convergence Protocol, PDCP, protocol functionality for a network unit 10; and
 enable an X2 interface between said RRC and/or PDCP protocol functionality of the network unit 10 and lower protocol layer(s) and/or sub-layer(s) of another remote network unit 20.

In another particular embodiment, the computer program 425; 435 comprises instructions, which when executed by at least one processor 410, cause the processor(s) 410 to:
 execute Radio Link Control, RLC, and/or Medium Access Control, MAC, protocol functionality for a network unit 20; and
 enable an X2 interface between said RLC and/or MAC protocol functionality of the network unit 20 and higher protocol layer(s) and/or sub-layer(s) of another remote network unit 10.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 18:
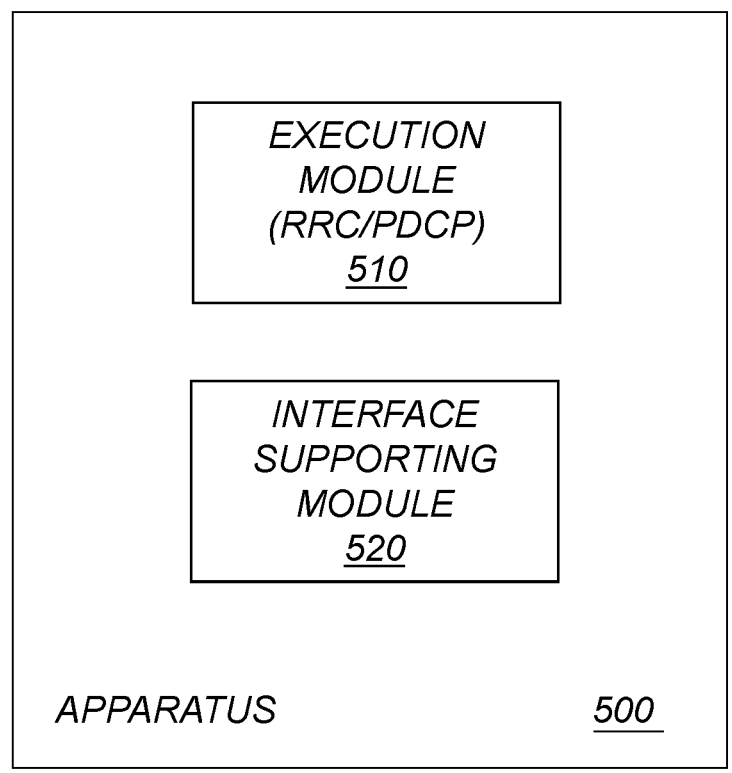
FIG. 18 is a schematic block diagram illustrating an example of an apparatus for supporting operation of a network unit according to an embodiment.

FIG. 18 is a schematic block diagram illustrating an example of an apparatus for supporting operation of a network unit according to an embodiment. The apparatus 500 comprises:
- an execution module 510 for executing Radio Resource Control, RRC, and/or Packet Data Convergence Protocol, PDCP, protocol functionality for a network unit 10; and
- an interface supporting module 520 for enabling an X2 interface between the RRC and/or PDCP protocol functionality of the network unit 10 and lower protocol layer(s) and/or sub-layer(s) of another remote network unit 20.

Figure 19:
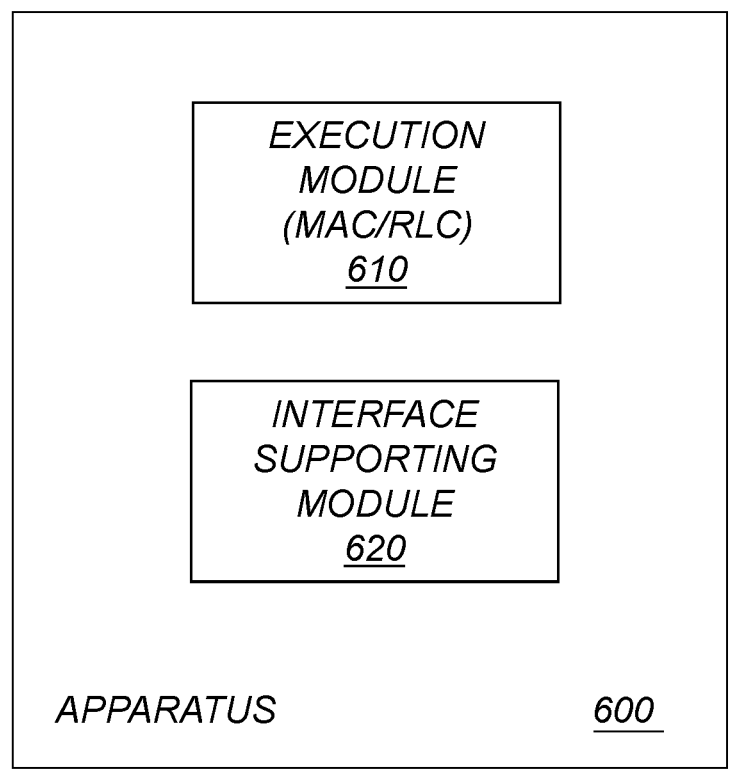
FIG. 19 is a schematic block diagram illustrating an example of another apparatus for supporting operation of a network unit according to an embodiment.

FIG. 19 is a schematic block diagram illustrating an example of another apparatus for supporting operation of a network unit according to an embodiment.

The apparatus 600 comprises:
- an execution module 610 for executing Radio Link Control, RLC, and/or Medium Access Control, MAC, protocol functionality for a network unit 20;
- an interface supporting module 620 for enabling an X2 interface between the RLC and/or MAC protocol functionality of the network unit 20 and higher protocol layer(s) and/or sub-layer(s) of another remote network unit 10.

Alternatively it is possible to realize the module(s) in FIG. 18 and FIG. 19 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely a question of implementation selection.

As already described, a network unit of the proposed technology may be implemented in a network device, e.g. a core network unit or a cloud-based network device.

The network device may be any suitable network device in the wireless communication system, or a network device in connection with the wireless communication system.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), e.g. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:
- Consolidation of network functionality into virtualized software running on customized or generic hardware. This is sometimes referred to as network function virtualization.
- Co-location of one or more application stacks, including operating system, running on separate hardware onto a single hardware platform. This is sometimes referred to as system virtualization, or platform virtualization.
- Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A network device may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A network unit for a wireless communication system, the network unit comprising:
a processor; and
memory having instructions executable by the processor to:
provide Radio Resource Control (RRC) or Packet Data Convergence Protocol (PDCP) protocol functionality, and
provide an X2 interface between said RRC or PDCP protocol functionality of said network unit and at least one of Radio Link Control (RLC) and Medium Access Control (MAC) protocol functionality of a remote network unit, wherein said X2 interface includes at least one of an X2 Application Protocol (X2AP) interface and an X2 User (X2U) interface, wherein an X2 unit is configured to provide said X2 interface for transfer of measurement feedback information and at least one of control signaling and user data.

2. The network unit of claim 1, wherein said network unit is configured to provide said RRC and said PDCP protocol functionality, and wherein said remote network unit provides said RLC and said MAC protocol functionality.

3. The network unit of claim 1, wherein said network unit is configured to provide said RRC protocol functionality, and wherein said remote network unit provides PDCP, said RLC, and said MAC protocol functionality.

4. The network unit of claim 1, wherein said X2 unit is configured to provide said X2 interface for transfer of at least one of RRC control signaling, Non-Access Stratum (NAS) control signaling, and base station Control Management signaling between said network unit and said remote network unit.

5. The network unit of claim 4, wherein said X2 unit is configured to send or receive an X2AP message having an information element (IE) denoted Transparent Packet Data Unit (PDU) including at least one of an RRC PDU, a NAS PDU, and a Control Management PDU for transparently sending or receiving said at least one of the RRC PDU, the NAS PDU, and the Control Management PDU to or from said remote network unit via said X2 interface.

6. The network unit of claim 5, wherein said X2 unit is configured to send or receive said X2AP message having IE denoted Transparent PDU Type indicating type of content of the IE denoted Transparent PDU.

7. The network unit of claim 1, wherein said remote network unit is part of a radio unit in a radio access network, and wherein said network unit is configured to send or receive control signaling to or from said at least one of RLC and said MAC protocol functionality of said remote network unit via said X2 interface to support connection establishment, for radio access with said radio unit, for a wireless communication device camping in a coverage area of said radio unit.

8. The network unit of claim 1, wherein said network unit and said remote network unit are parts of a distributed base station, and wherein said network unit is configured to send or receive control signaling to or from said at least one of RLC and said MAC protocol functionality of said remote network unit via said X2 interface as part of operating the distributed base station.

9. A network unit for a wireless communication system, the network unit comprising:
 a processor; and
 memory having instructions executable by the processor to:
  provide Radio Link Control (RLC) or Medium Access Control (MAC) protocol functionality, and
  provide an X2 interface between said RLC or MAC protocol functionality of said network unit and at least one of Radio Resource Control (RRC) and Packet Data Convergence Protocol (PDCP) protocol functionality of a remote network unit, wherein said X2 interface includes at least one of an X2 Application Protocol (X2AP) interface and an X2 User (X2U) interface, wherein an X2 unit is configured to provide said X2 interface for transfer of measurement feedback information and at least one of control signaling and user data.

10. The network unit of claim 9, wherein said network unit is configured to provide said RLC and said MAC protocol functionality, and wherein said remote network unit provides said RRC and said PDCP protocol functionality.

11. The network unit of claim 9, wherein said network unit is configured to provide PDCP, said RLC, and said MAC protocol functionality, and wherein said remote network unit provides said RRC protocol functionality.

12. The network unit of claim 9, wherein said X2 unit is configured to provide said X2 interface for transfer of at least one of RRC control signaling, Non-Access Stratum (NAS) control signaling, and base station Control Management signaling between said network unit and said remote network unit.

13. The network unit of claim 12, wherein said X2 unit is configured to send or receive an X2AP message having an information element (IE) denoted Transparent Packet Data unit (PDU) including an RRC PDU, a NAS PDU, or a Control Management PDU for transparently sending or receiving said RRC PDU, said NAS PDU, or said Control Management PDU to or from said remote network unit.

14. The network unit of claim 13, wherein said X2 unit is configured to send or receive said X2AP message having IE denoted Transparent PDU Type indicating type of content of the IE denoted Transparent PDU.

15. The network unit of claim 9, wherein said network unit is provided for location in a radio unit, and wherein said network unit is configured to send or receive control signaling to or from said at least one of RRC and said PDCP protocol functionality of said remote network unit via said X2 interface to support connection establishment, for radio access with said radio unit, for a wireless communication device camping in a coverage area of said radio unit.

16. The network unit of claim 9, wherein said network unit and said remote network unit are parts of a distributed base station, and wherein said network unit is configured to send or receive control signaling to or from said at least one of RRC and said PDCP protocol functionality of said remote network unit via said X2 interface as part of operating the distributed base station.

17. A method of operating a network unit, said method comprising:
 executing Radio Resource Control (RRC) or Packet Data Convergence Protocol (PDCP) protocol functionality;
 providing an X2 interface between said RRC or PDCP protocol functionality of said network unit and a lower protocol layer or sub-layer of a remote network unit not having said RRC or PDCP functionality, wherein said lower protocol layer or sub-layer of said remote network unit includes Radio Link Control (RLC) or Medium Access Control (MAC) protocol functionality; and
 sending or receiving, via said X2 interface, measurement feedback information and at least one of control signaling and user data.

18. The method of claim 17, wherein said executing step comprises executing both said RRC and said PDCP protocol functionality, and
 wherein said lower protocol layer or sub-layer of said remote network unit includes said RLC and said MAC protocol functionality.

19. The method of claim 17, wherein said executing step comprises executing said RRC protocol functionality, and
 wherein said lower protocol layer or sub-layer of said remote network unit includes PDCP, said RLC, and said MAC protocol functionality.

20. The method of claim 17, wherein said X2 interface includes an X2 Application Protocol (X2AP) interface or an X2 User (X2U) interface.

21. The method of claim 20, wherein said sending or receiving step comprises sending or receiving at least one of RRC control signaling, Non-Access Stratum (NAS) control signaling, and base station Control Management signaling to or from said remote network unit.

22. The method of claim 21, wherein said sending or receiving step comprises sending or receiving an X2AP message having an information element (IE) denoted Transparent Packet Data unit (PDU) including an RRC PDU, a NAS PDU, or a Control Management PDU for transparently sending or receiving said RRC PDU, said NAS PDU, or said Control Management PDU to or from said remote network unit via said X2 interface.

23. The method of claim 22, wherein said sending or receiving step comprises sending or receiving said X2AP message having IE denoted Transparent PDU Type indicating type of content of the IE denoted Transparent PDU.

24. The method of claim 17, wherein said remote unit is part of a radio unit in a radio access network, and wherein said method further comprises sending or receiving control signaling to or from the lower protocol layer or sub-layer of said remote network unit via said X2 interface to support connection establishment, for radio access with said radio unit, for a wireless communication device camping in a coverage area of said radio unit.

25. The method of claim 17, wherein said network unit and said remote network unit are parts of a distributed base station, and wherein said method further comprises sending or receiving control signaling to or from the lower protocol layer or sub-layer of said remote network unit via said X2 interface as part of operating the distributed base station.

26. A method of operating a network unit, said method comprising: executing Radio Link Control (RLC) or Medium Access Control (MAC) protocol functionality;
   providing an X2 interface between said RLC or MAC protocol functionality of said network unit and at least one of Radio Resource Control (RRC) and Packet Data Convergence Protocol (PDCP) protocol functionality of a remote network unit, wherein
   said X2 interface includes at least one of an X2 Application Protocol (X2AP) interface and an X2 User (X2U) interface; and
   sending or receiving, via said X2 interface, measurement feedback information and at least one of control signaling and user data.

27. The method of claim 26, wherein said executing step comprises executing both said RLC and said MAC protocol functionality, and
   wherein said remote network unit provides said RRC and said PDCP protocol functionality.

28. The method of claim 26, wherein said executing step comprises executing PDCP, said RLC, and said MAC protocol functionality, and
   wherein said remote network unit provides said RRC and said PDCP protocol functionality.

29. The method of claim 26, wherein said sending or receiving step comprises sending or receiving at least one of RRC control signaling, Non-Access Stratum (NAS) control signaling, and base station Control Management signaling to or from said remote network unit.

30. The method of claim 29, wherein said sending or receiving step comprises sending or receiving an X2AP message having an information element (IE) denoted Transparent Packet Data unit (PDU) including an RRC PDU, a NAS PDU, or a Control Management PDU for transparently sending or receiving said RRC PDU, said NAS PDU, or said Control Management PDU to or from said remote network unit.

31. The method of claim 30, wherein said sending or receiving step comprises sending or receiving said X2AP message having IE denoted Transparent PDU Type indicating type of content of the IE denoted Transparent PDU.

32. The method of claim 26, wherein said network unit is provided for location in a radio unit, and wherein said method further comprises sending or receiving control signaling to or from said at least one of RRC and said PDCP protocol functionality of said remote network unit via said X2 interface to support connection establishment, for radio access with said radio unit, for a wireless communication device camping in a coverage area of said radio unit.

33. The method of claim 26, wherein said network unit and said remote network unit are parts of a distributed base station, and wherein said method further comprises sending or receiving control signaling to or from said at least one of RRC and said PDCP protocol functionality of said remote network unit via said X2 interface as part of operating the distributed base station.

* * * * *

UNITED STATES PATENT AND TRADEMARK OFFICE
CERTIFICATE OF CORRECTION

PATENT NO. : 11,356,986 B2
APPLICATION NO. : 15/768441
DATED : June 7, 2022
INVENTOR(S) : Östrup et al.

It is certified that error appears in the above-identified patent and that said Letters Patent is hereby corrected as shown below:

In the Specification

In Column 4, Lines 14-15, delete "sub-layer(s) a radio node/base station" and insert -- sublayer(s) of a radio node/base station --, therefor.

In Column 5, Line 16, delete "the MAC lower of L2." and insert -- the MAC layer of L2. --, therefor.

In Column 6, Line 45, delete "base stations base stations, eNbs," and insert -- base stations, eNBs, --, therefor.

In Column 6, Line 47, delete "eNb to another eNb" and insert -- eNB to another eNB --, therefor.

In Column 8, Line 46, delete "unit," and insert -- Unit, --, therefor.

In Column 10, Line 3, delete "as described herein" and insert -- as described herein. --, therefor.

In Column 10, Lines 10-11, delete "The radio units 20 communicate with a" and insert -- The network units 20 communicate with a --, therefor.

In Column 10, Line 24, delete "same or 10 different radio" and insert -- same or different radio --, therefor.

In Column 10, Line 39, delete "service radio bearer units, SRBs," and insert -- service radio bearer, SRB, units, --, therefor.

In Column 10, Line 45, delete "SRB units 210, 202" and insert -- SRB units, 201, 202 --, therefor.

In Column 10, Line 50, delete "sub-layer(s) a radio" and insert -- sublayer(s) of a radio --, therefor.

In Column 11, Line 42, delete "unit," and insert -- Unit, --, therefor.

Signed and Sealed this
Ninth Day of May, 2023

Katherine Kelly Vidal
*Director of the United States Patent and Trademark Office*

CERTIFICATE OF CORRECTION (continued)
U.S. Pat. No. 11,356,986 B2

In Column 12, Line 36, delete "unit," and insert -- Unit, --, therefor.

In Column 13, Line 27, delete "eNb, SENB," and insert -- eNB, SeNB, --, therefor.

In Column 13, Line 45, delete "SeNb" and insert -- SeNB --, therefor.

In Column 13, Line 47, delete "eNb" and insert -- eNB --, therefor.

In Column 13, Line 50, delete "eNb" and insert -- eNB --, therefor.

In Column 14, Line 6, delete "message. I.e. if" and insert -- message, i.e. if --, therefor.

In Column 15, Line 34, delete "the arrangement/system 100" and insert -- the arrangement/network unit 100 --, therefor.

In Column 15, Line 64, delete "in connection with suitable memory unit(s) 320." and insert -- in connection with suitable memory(s) 320. --, therefor.

In Column 16, Lines 62-63, delete "carried or stored on a computer-readable medium 420; 430, in particular a non-volatile medium." and insert -- carried or stored on a computer-readable memory, in particular a non-volatile medium. --, therefor.

In Column 18, Line 28, delete "it may often desirable" and insert -- it may often be desirable --, therefor.

In Column 18, Lines 44-45, delete "use common off-the-shelf (COTS)" and insert -- use commercial off-the-shelf (COTS) --, therefor.

In the Claims

In Column 22, Line 49, in Claim 22, delete "unit" and insert -- Unit --, therefor.

In Column 24, Line 6, in Claim 30, delete "unit" and insert -- Unit --, therefor.